United States Patent
Enami

(10) Patent No.: US 11,474,947 B2
(45) Date of Patent: Oct. 18, 2022

(54) INFORMATION PROCESSING APPARATUS AND NON-TRANSITORY COMPUTER-READABLE STORAGE MEDIUM STORING CACHE CONTROL PROGRAM

(71) Applicant: FUJITSU LIMITED, Kawasaki (JP)

(72) Inventor: Takashi Enami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/338,827

(22) Filed: Jun. 4, 2021

(65) Prior Publication Data
US 2022/0058128 A1    Feb. 24, 2022

(30) Foreign Application Priority Data
Aug. 18, 2020    (JP) .............................. JP2020-137906

(51) Int. Cl.
| | |
|---|---|
| G06F 12/08 | (2016.01) |
| G06F 12/0864 | (2016.01) |
| G06F 12/0895 | (2016.01) |
| G06F 12/128 | (2016.01) |
| G06F 12/0868 | (2016.01) |

(52) U.S. Cl.
CPC ...... *G06F 12/0864* (2013.01); *G06F 12/0868* (2013.01); *G06F 12/0895* (2013.01); *G06F 12/128* (2013.01); *G06F 2212/1024* (2013.01); *G06F 2212/6082* (2013.01)

(58) Field of Classification Search
None
See application file for complete search history.

(56) References Cited

U.S. PATENT DOCUMENTS

| | | | | |
|---|---|---|---|---|
| 9,058,113 | B2 * | 6/2015 | Inagaki | ................. G06F 3/0689 |
| 2003/0093622 | A1 * | 5/2003 | Desota | ................ G06F 12/0848 |
| | | | | 711/E12.018 |
| 2008/0177975 | A1 * | 7/2008 | Kawamura | ......... G06F 16/2282 |
| | | | | 711/E12.002 |

(Continued)

FOREIGN PATENT DOCUMENTS

| | | |
|---|---|---|
| JP | 64-68855 A | 3/1989 |
| JP | 2-287849 A | 11/1990 |

(Continued)

*Primary Examiner* — Tracy C Chan
(74) *Attorney, Agent, or Firm* — ArentFox Schiff LLP

(57) ABSTRACT

An information processing apparatus includes a processor. The processor configured to allocate, to a process, a first number of first divided regions from among a plurality of divided regions obtained by division of a cache, and determine, based on an address of each data block corresponding to the process and the first number, a storage destination of the data block corresponding to the process from among the first divided regions. The processor configured to determine a second number that is a divisor of the first number, identify, for the individual first divided regions after the reduction, second divided regions from among the first divided regions before the reduction, determine data blocks to be stored in the individual first divided regions after the reduction by allocating data blocks to the first divided regions after the reduction from the corresponding second divided regions in ascending order of purging order.

8 Claims, 20 Drawing Sheets

(56) References Cited

U.S. PATENT DOCUMENTS

2012/0246408 A1 9/2012 Yamamura et al.
2013/0205089 A1* 8/2013 Soerensen ........... G06F 12/0811
　　　　　　　　　　　　　　　　　　　　　　711/122

FOREIGN PATENT DOCUMENTS

JP　　　　11-259362　A　　9/1999
JP　　　2012-203729　A　　10/2012

* cited by examiner

FIG. 7

| ABSOLUTE SET NUMBER | INTRA-PROCESS SET NUMBER | PROCESS IDENTIFIER |
|---|---|---|
| 0 | 0 | P11 |
| 1 | 1 | P11 |
| 2 | 2 | P11 |
| 3 | 0 | P12 |
| 4 | 1 | P12 |
| ... | ... | ... |

142

INFORMATION PROCESSING APPARATUS AND NON-TRANSITORY COMPUTER-READABLE STORAGE MEDIUM STORING CACHE CONTROL PROGRAM

CROSS-REFERENCE TO RELATED APPLICATION

This application is based upon and claims the benefit of priority of the prior Japanese Patent Application No. 2020-137906, filed on Aug. 18, 2020, the entire contents of which are incorporated herein by reference.

FIELD

The embodiments discussed herein are related to an information processing apparatus and a non-transitory computer-readable storage medium.

BACKGROUND

When access is made to a storage device, the access performance may be improved by using, as a cache, a storage device having a higher access speed than the storage device.

In relation to such cache control, controlling a region of a cache in association with a process or a job has been proposed. For example, there has been proposed an arithmetic processing device that enables a region of a cache to be arbitrarily divided in units of blocks in association with a process ID. A control method has been proposed in which, at the time of cache registration, an ID of a job that is being executed at that time is registered for each entry, and at the time of completion of execution of the job, a cache entry portion having the job ID alone is permitted to be flushed.

For example, Japanese Laid-open Patent Publication No. 2012-203729 and Japanese Laid-open Patent Publication No. 11-259362 are disclosed as the related art.

SUMMARY

According to an aspect of the embodiments, an information processing apparatus includes: a memory included a region of a cache; and a processor configured to perform a first processing when controlling, by using the cache, reading of data blocks from and writing of data blocks to a storage device by a plurality of processes, the first processing includes: allocating, to a first process among the plurality of processes, a first number of first divided regions from among a plurality of divided regions obtained by division of the cache, and determining, based on an address of each data block corresponding to the first process and the first number, a storage destination of the data block corresponding to the first process from among the first divided regions, wherein the processor is further configured to perform a second processing when reducing the number of first divided regions allocated to the first process, the second processing includes: determining the number of first divided regions after the reduction to be a second number that is a divisor of the first number, identifying, for the individual first divided regions after the reduction, based on positional relationships between the first divided regions before the reduction and the first divided regions after the reduction, a plurality of divided regions as second divided regions from among the first divided regions before the reduction, determining data blocks to be stored in the individual first divided regions after the reduction by allocating data blocks to the first divided regions after the reduction from the corresponding second divided regions in ascending order of purging order, and releasing a remaining divided region obtained by excluding the first divided regions after the reduction from the first divided regions before the reduction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating a configuration example of set management information;

DESCRIPTION OF EMBODIMENTS

As a method of managing a region of a cache in association with a process, a method of managing a region of a cache in units of divided regions called sets and allocating one or more sets to each process is conceivable. In this method, for example, when a plurality of sets are allocated to a process, a storage-destination set of a data block subjected to input/output (I/O) performed by the process is determined through a remainder calculation that uses the address of the data block and the number of allocated sets.

When such a management method is used, in order to obtain a free space in the cache, reducing the number of sets already allocated to a certain process is conceivable. This case involves an issue in how to efficiently determine which of the sets used after the reduction stores a data block to be left in the cache among data blocks stored in the respective sets before the reduction. For example, a case where the storage destination is determined by performing a remainder calculation for every data block to be left in the cache involves an issue in that the calculation load is high. For example, in a case where a hash value is calculated based on the address of a data block in this remainder calculation, an increase in the calculation load becomes marked.

In one aspect, an object of the present disclosure is to provide an information processing apparatus and a cache control program capable of reducing, when the number of allocated divided regions in a cache is reduced, a processing load for determining a data storage destination from among the divided regions used after the reduction.

Embodiments of the present disclosure will be described below with reference to the drawings.

First Embodiment

Figure 1:
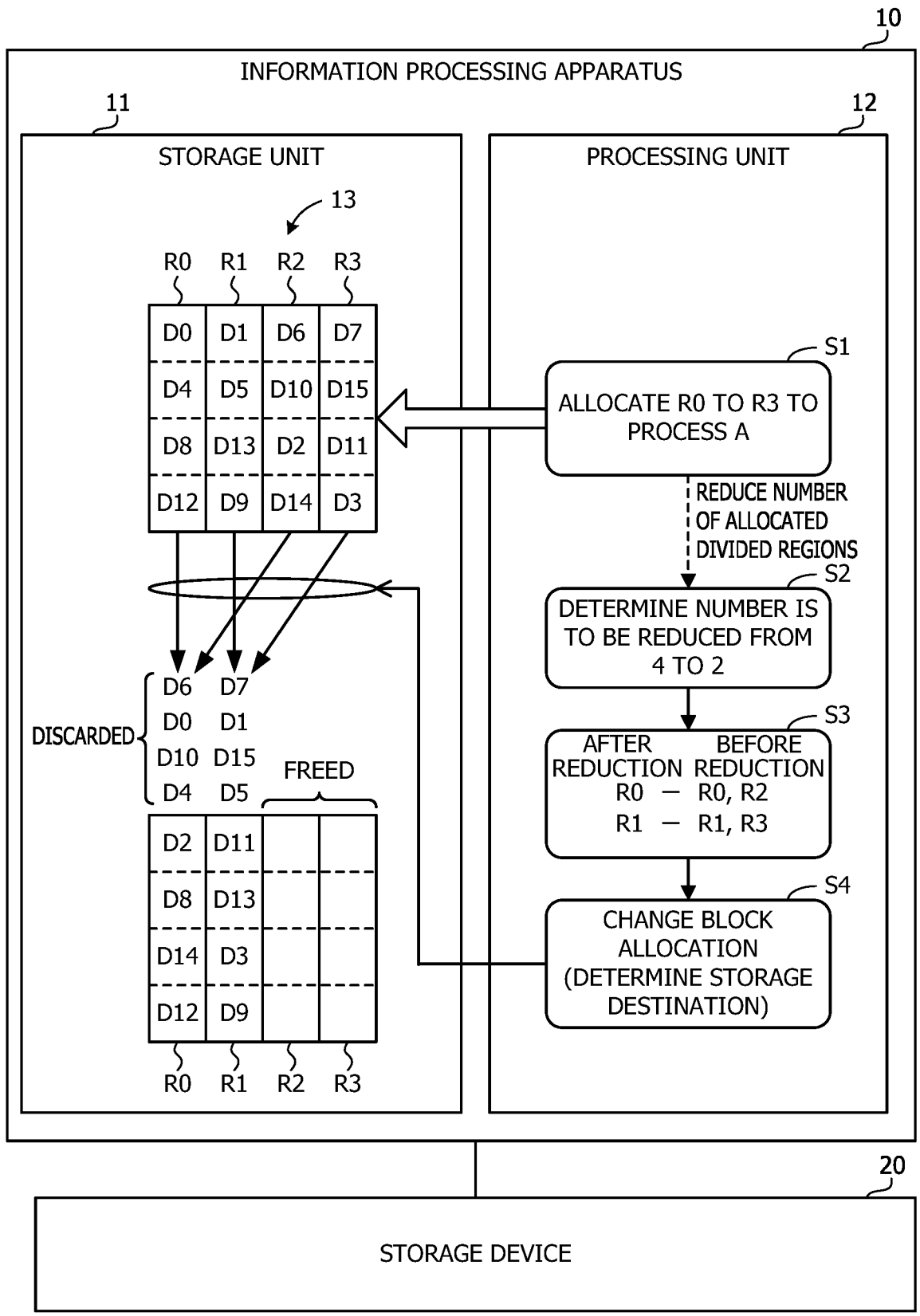
FIG. 1 is a diagram illustrating a configuration example and a processing example of an information processing system according to a first embodiment.

FIG. 1 is a diagram illustrating a configuration example and a processing example of an information processing system according to a first embodiment. The information processing system illustrated in FIG. 1 includes an information processing apparatus 10 and a storage device 20. The information processing apparatus 10 is capable of controlling writing of a data block to the storage device 20 and reading of a data block from the storage device 20.

The information processing apparatus 10 includes a storage unit 11 and a processing unit 12.

The storage unit 11 is implemented by a storage device having a higher access speed than the storage device 20. The storage unit 11 includes a region of a cache 13 used when access is made to the storage device 20. The cache 13 temporarily stores part of data blocks stored in the storage device 20.

The cache 13 is divided into divided regions R0 to R3. Each of the divided regions R0 to R3 is capable of storing a certain number of data blocks or less. Purging control is individually performed in each of the divided regions R0 to R3. It is assumed in FIG. 1 that the downward direction indicates the head side of the divided regions and the upward direction indicates the tail side of the divided regions. It is also assumed that the purging order (purging priority) is higher on the upper side (on the tail side) of the divided regions.

The processing unit 12 is implemented, for example, as a processor. The processing unit 12 controls, by using the cache 13, reading data blocks from and writing of data blocks to the storage device 20 that are performed by a plurality of processes. In this control, the processing unit 12 is capable of allocating one or more divided regions in the cache 13 to each process.

It is assumed in the example of FIG. 1 that the processing unit 12 allocates four divided regions R0 to R3 to a process A (step S1). It is assumed that, for example, data blocks D0 to D15 read from the storage device 20 by the process A are then stored in the divided regions R0 to R3.

The processing unit 12 determines a divided region serving as a storage destination of a data block relating to a certain process through a calculation that uses the number of divided regions allocated to the process and the address of the data block. For example, it is assumed that the region numbers of the respective divided regions R0, R1, R2, and R3 among the divided regions allocated to the process A are 0, 1, 2, and 3, respectively. It is also assumed that a value "X" in a "data block DX" denotes the address of the data block and that Y denotes the number of divided regions allocated to the process A. In this case, the region number of the storage destination of the data block DX is determined through a remainder calculation of "X mod Y" (the remainder obtained when the address X is divided by the number Y).

A case where the number of divided regions allocated to the process A is reduced will be described next. For example, in a case where free divided regions are desired to be created in the cache 13 in order to obtain divided regions for another process B, the number of divided regions allocated to the process A is reduced.

In this case, the processing unit 12 determines that the number of divided regions allocated to the process A is to be reduced to a divisor of the current number Y=4. In the example of FIG. 1, the number of divided regions after the reduction is determined to be "2" that is a divisor of "4" (step S2). It is assumed that the divided regions allocated to the process A are reduced from the divided regions R0 to R3 to the divided regions R0 and R1.

For each of the divided regions R0 and R1 used after the reduction, the processing unit 12 identifies, as "target divided regions", a plurality of divided regions from among the divided regions R0 to R3 used before the reduction. This identification is performed based on positional relationships between the divided regions R0 to R3 used before the reduction and the divided regions R0 and R1 used after the reduction. For example, when Y' denotes the number of allocated divided regions after the reduction, the target divided regions corresponding to one divided region used after the reduction are identified by selecting divided regions from among the divided regions used before the reduction at an interval of Y' with respect to the one divided region serving as an origin.

In the example of FIG. 1, since Y'=2, target divided regions corresponding to the divided region R0 used after the reduction are identified by selecting divided regions at an interval of 2 with respect to the divided region R0 that is used before the reduction and that serves as the origin. Consequently, the divided regions R0 and R2 are identified as the target divided regions corresponding to the divided region R0 used after the reduction. Target divided regions corresponding to the divided region R1 used after the reduction are identified by selecting divided regions at an interval of 2 with respect to the divided region R1 that is used before the reduction and that serves as the origin. Consequently, the divided regions R1 and R3 are identified as the target divided regions corresponding to the divided region R1 used after the reduction (step S3).

The processing unit 12 then allocates, to each of the divided regions R0 and R1 used after the reduction, data blocks from the corresponding target divided regions in ascending order of the purging order. Consequently, the divided regions that serve as, after the reduction, storage destinations of the individual data blocks stored in the divided regions R0 to R3 before the reduction are determined (step S4).

In the example of FIG. 1, to the divided region R0 used after the reduction, data blocks are allocated in ascending order of the purging order from the divided regions R0 and R2 that are used before the reduction and that are the corresponding target divided regions. Consequently, data blocks are allocated in an order of data blocks D12, D14, D8, D2, D4, D10, D0, and D6 from the head side of the divided region R0 used after the reduction. However, the data blocks D4, D10, D0, and D6 that overflow from the divided region R0 are discarded.

To the divided region R1 used after the reduction, data blocks are allocated in ascending order of the purging order from the divided regions R1 and R3 that are used before the reduction and that are the corresponding target divided regions. Consequently, data blocks are allocated in an order of data blocks D9, D3, D13, D11, D5, D15, D1, and D7 from the head side of the divided region R1 used after the reduction. However, the data blocks D5, D15, D1, and D7 that overflow from the divided region R1 are discarded.

After the data blocks to be stored in the divided regions R0 and R1 after the reduction are determined in this manner, the rest of the divided regions, namely, the divided regions R2 and R3 are freed (released).

As another processing example of determining divided regions serving as storage destinations of the data blocks D0 to D15 after the reduction, a method of performing, for all the data blocks D0 to D15, the aforementioned remainder calculation using the number Y' of divided regions used after the reduction and the addresses of the respective data blocks is conceivable. However, in this method, the remainder calculation is to be performed for all the data blocks D0 to D15. Thus, a processing load is high and it takes some time to determine storage destinations for all of these data blocks.

In contrast, according to the above-described processing performed by the processing unit 12, a divided region serving as the storage destination of data blocks after the reduction is determined based on divided regions that store the data blocks before the reduction. For example, through the processing of step S3, the storage destination, after the reduction, of the data blocks stored in the divided regions R0 and R2 before the reduction is determined to be the divided region R0. The storage destination, after the reduction, of the data blocks stored in the divided regions R1 and R3 before the reduction is determined to be the divided region R1. As described above, by determining the storage destination after the reduction not in units of data blocks but in units of divided regions used before the reduction, the processing load for the determination may be reduced and the time taken for the determination may be shortened.

Therefore, when the number of allocated divided regions in the cache 13 is reduced, the information processing apparatus 10 according to the first embodiment may reduce the processing load for determining the storage destination of the data blocks from among the divided regions used after the reduction.

In the first embodiment above, the remainder of division of the address X by the number Y is calculated in the remainder calculation for determining a divided region serving as the storage destination of the data blocks. However, this remainder calculation may calculate a remainder obtained when a hash value of the address X is divided by the number Y. In this case, the load of the remainder calculation increases by an amount corresponding to the included hash value calculation. According to the above-described processing in the first embodiment, such a high-load remainder calculation is no longer to be performed in order to determine the storage destination of data blocks after the number of divided regions is reduced. Thus, the processing load reduction effect further increases.

Second Embodiment

Figure 2:
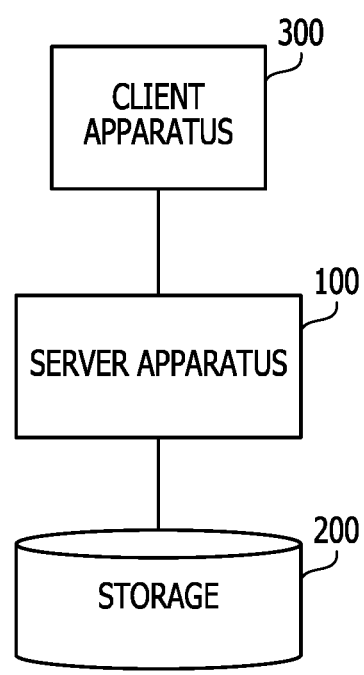
FIG. 2 is a diagram illustrating a configuration example of an information processing system according to a second embodiment.

FIG. 2 is a diagram illustrating a configuration example of an information processing system according to a second embodiment. The information processing system illustrated in FIG. 2 includes a server apparatus 100, a storage 200, and a client apparatus 300. The server apparatus 100 is an example of the information processing apparatus 10 illustrated in FIG. 1. The storage 200 is an example of the storage device 20 illustrated in FIG. 1.

The server apparatus 100 performs processing for providing various services, in response to requests from the client apparatus 300. In performing this processing, the server apparatus 100 is capable of performing I/O processing on the storage 200.

The storage 200 is equipped with one or more nonvolatile storage devices to be accessed from the server apparatus 100. In the present embodiment, by way of example, the storage 200 is equipped with hard disk drives (HDDs) serving as nonvolatile storage devices. Note that the storage 200 may be a local storage built in the server apparatus 100.

The client apparatus 300 requests the server apparatus 100 to perform processing and receives information indicating a result of the processing. For example, the client apparatus 300 implements a client function with respect to the server apparatus 100. However, the client apparatus 300 may be, for example, a server computer that performs various kinds of processing such as business-related processing. In this case, the server computer implements the client function with respect to the server apparatus 100. A plurality of client apparatuses 300 may be coupled to the server apparatus 100.

Figure 3:
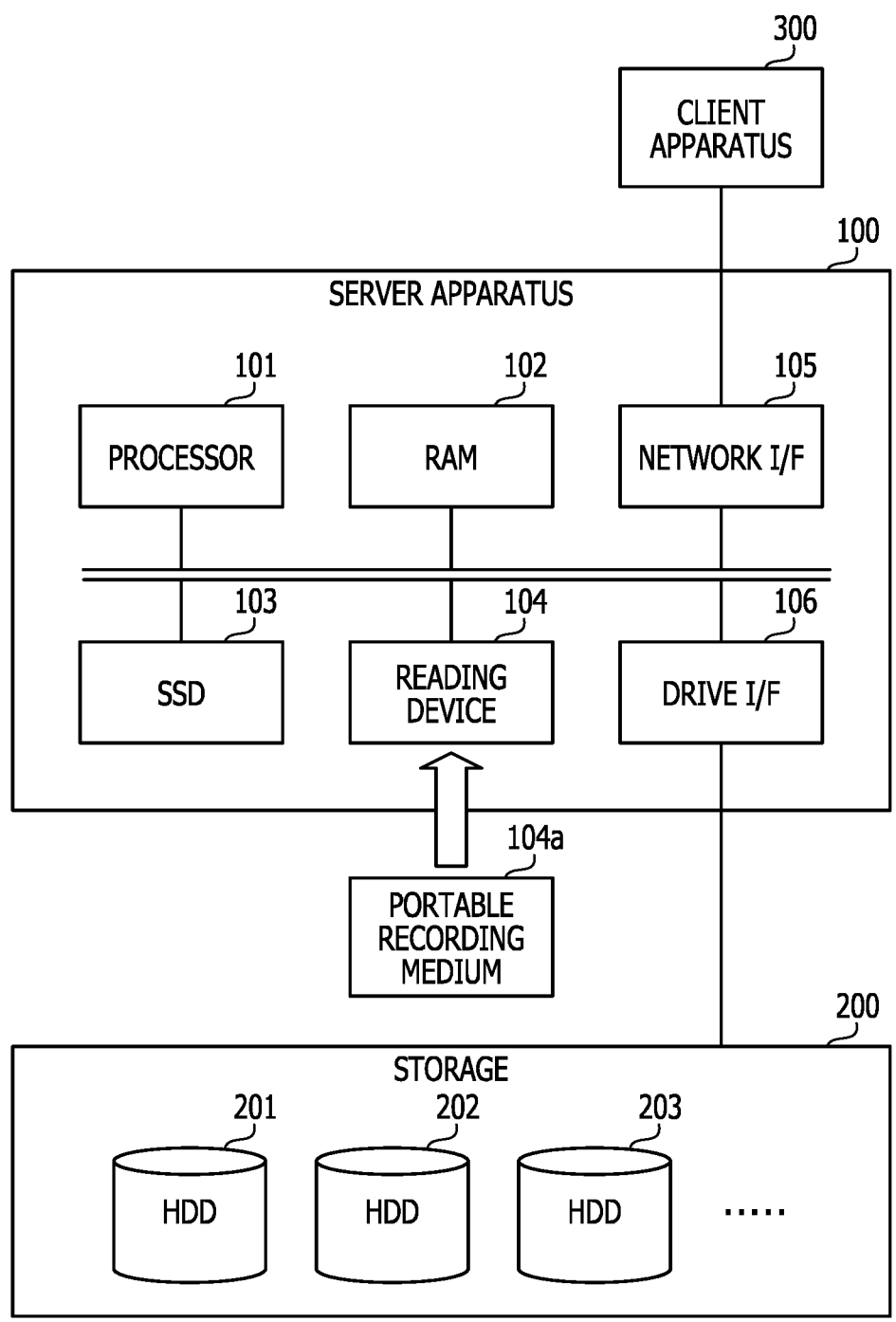
FIG. 3 illustrates hardware configuration examples of a server apparatus and a storage.

FIG. 3 illustrates hardware configuration examples of a server apparatus and a storage.

The server apparatus 100 includes a processor 101, a random access memory (RAM) 102, a solid state drive (SSD) 103, a reading device 104, and a network interface (I/F) 105, and a drive interface (I/F) 106.

The processor 101 centrally controls the entire server apparatus 100. The processor 101 is, for example, a central processing unit (CPU), a microprocessor unit (MPU), a digital signal processor (DSP), an application specific integrated circuit (ASIC), or a programmable logic device (PLD). The processor 101 may also be a combination of two or more elements among the CPU, the MPU, the DSP, the ASIC, and the PLD.

The RAM 102 is used as a main storage device of the server apparatus 100. The RAM 102 temporarily stores at least part of an operating system (OS) program and an application program to be executed by the processor 101. The RAM 102 also stores various kinds of data to be used in processing performed by the processor 101.

The SSD 103 is used as an auxiliary storage device of the server apparatus 100. The SSD 103 stores the OS program, the application program, and the various kinds of data. The SSD 103 is also used as a cache when access is made to HDDs in the storage 200. The function as the auxiliary storage device may be implemented using a nonvolatile storage device of another type, such as an HDD.

A portable recording medium 104a is removably mounted to the reading device 104. The reading device 104 reads data recorded in the portable recording medium 104a and transmits the data to the processor 101. Examples of the portable recording medium 104a include an optical disc, a semiconductor memory, and the like.

The network interface 105 is a communication interface device for communicating with the client apparatus 300. The network interface 105 communicates with the client apparatus 300 via a network such as a local area network (LAN), for example.

The drive interface 106 is a communication interface device for communicating with the HDDs included in the storage 200. The drive interface 106 communicates with the storage 200 by using, for example, Fibre Channel (FC), Internet Small Computer System Interface (iSCSI), Serial Advanced Technology Attachment (SATA), or the like.

The storage 200 includes HDDs 201, 202, 203, and so on as nonvolatile storage media.

Figure 4:
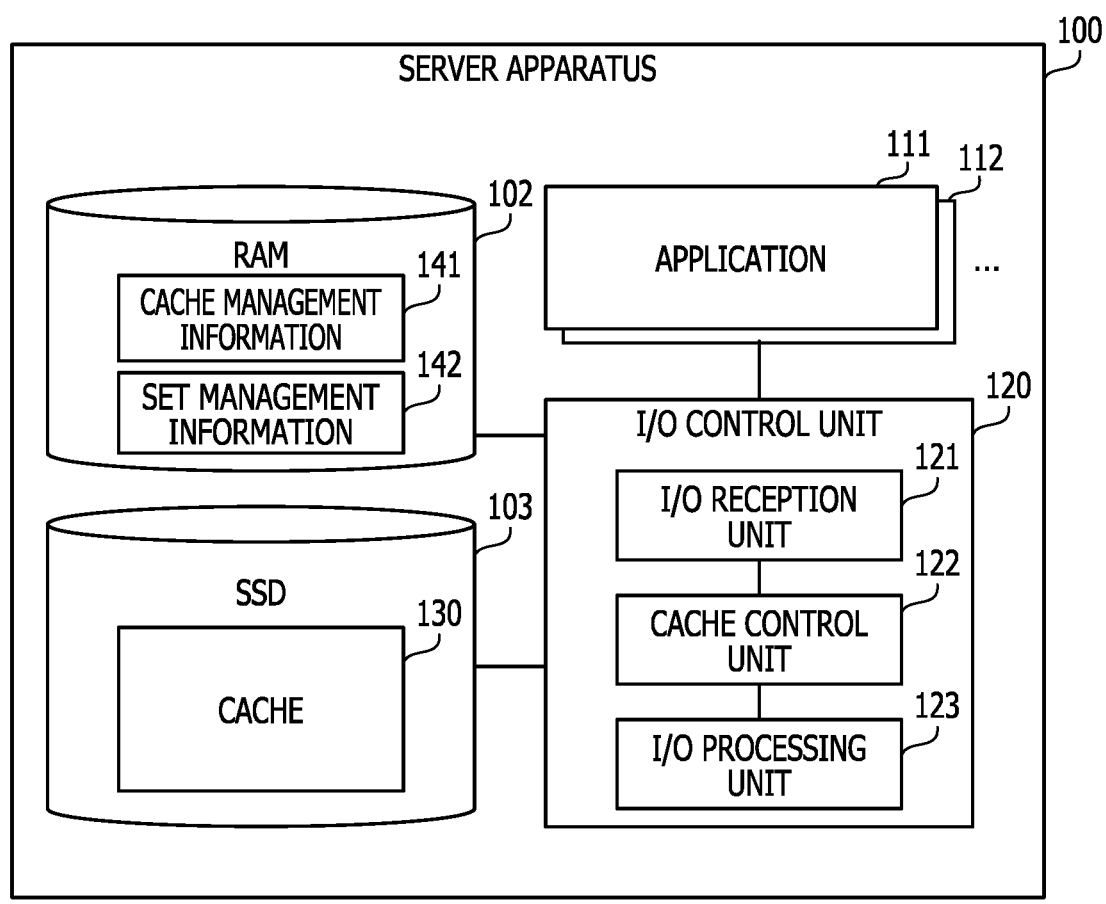
FIG. 4 is a diagram illustrating a configuration example of processing functions included in the server apparatus.

FIG. 4 is a diagram illustrating a configuration example of processing functions included in the server apparatus. The server apparatus 100 includes applications 111, 112, and so on, and an I/O control unit 120. Processing of the applications 111, 112, and so on, and processing of the I/O control unit 120 are implemented, for example, by the processor 101 of the server apparatus 100 executing predetermined application programs. A region of a cache 130 is allocated in the SSD 103. The RAM 102 stores cache management information 141 and set management information 142.

The applications 111, 112, and so on execute various kinds of processing, in response to requests from the client apparatus 300. The applications 111, 112, and so on are capable of accessing the HDDs 201, 202, 203, and so on in the storage 200 via the I/O control unit 120.

In response to a request from the application 111, 112, or the like, the I/O control unit 120 accesses the HDD 201, 202, 203, or the like in the storage 200 by using the cache 130. The I/O control unit 120 includes an I/O reception unit 121, a cache control unit 122, and an I/O processing unit 123.

The I/O reception unit 121 receives an I/O request (write request or read request) from the application 111, 112, or the like. The cache control unit 122 controls, by using the cache 130, I/O processing corresponding to an I/O request received by the I/O reception unit 121. In accordance with an instruction from the cache control unit 122, the I/O processing unit 123 writes data to the HDD 201, 202, 203, or the like in the storage 200 or reads data from the HDD 201, 202, 203, or the like.

The cache 130 is managed in units of regions called "sets". Each set includes a certain number of unit regions (cache lines. Hereinafter, referred to as "lines".) or less. This line serves as the minimum unit region. One or more sets may be allocated to each process.

The cache management information 141 includes management information (management block) for each line in the cache 130. The management blocks are linked to each other and managed in units of sets. Thus, data stored in the cache 130 is managed in units of sets. The set management information 142 stores in association with each other an absolute set number in the cache 130 and an intra-process set number that is a logical set number within each process.

Figure 5:
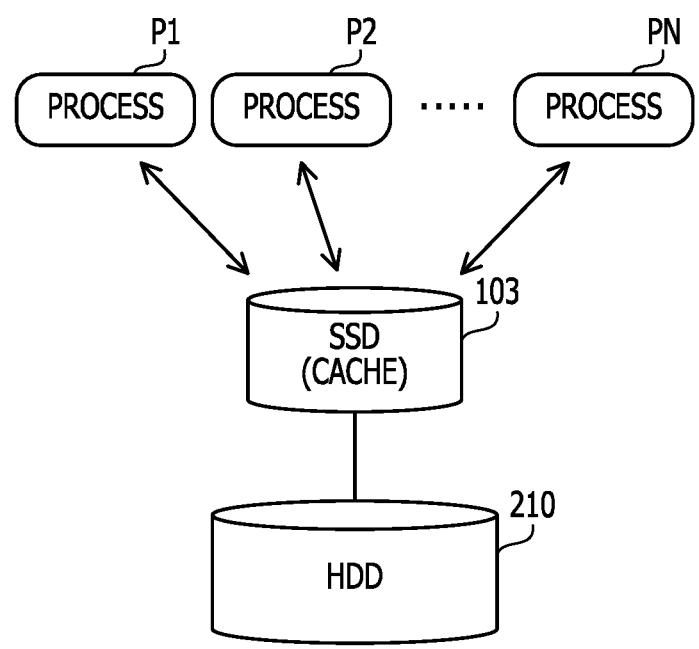
FIG. 5 is a diagram for describing cache control performed in consideration of processes.

FIG. 5 is a diagram for describing cache control performed in consideration of processes. An SSD usually has a higher access speed than an HDD. Therefore, by using an SSD as a cache, access to a lower-speed HDD may be made faster.

An HDD 210 illustrated in FIG. 5 is a storage region implemented by the one or plurality of HDDs included in the storage 200. A unit storage region to be accessed is designated by a block address. This block address may be a physical address (for example, a sector number) of the one or plurality of HDDs, or may be a logical address of a logical storage region implemented by the one or plurality of HDDs.

In the present embodiment, as illustrated in FIG. 5, the SSD 103 of the server apparatus 100 is used as a cache (the cache 130 in FIG. 4) when access is made to the HDD 210. Thus, the speed of access from the application 111, 112, or the like to the HDD 210 may be increased.

The storage device included in the storage 200 may be of the same type as that of the storage device used as the cache. Even in such a case, for example, if the storage devices of the storage 200 are deployed as distributed storages via a network, the network may become a bottleneck and the access speed of access to the storage devices of the storage 200 may not be achieved performance as expected. Therefore, the use of the cache may improve the data access speed.

In the server apparatus 100, a plurality of processes P1, P2, . . . , PN relating to processing of accessing the HDD 210 are executed. The term "process" used herein refers to, for example, a task or container included in processing implemented by the application 111, 112, or the like. A cache is usually managed by using a block address in the HDD 210. In this case, the cache region allocated in the SSD 103 is used in common by the processes P1, P2, . . . , and PN.

In contrast, in the present embodiment, the region of the cache 130 in the SSD 103 is allocated in units of processes. This method enables cache control to be performed in consideration of the priority for each process. For example, it is assumed that a first region and a second region are allocated in the cache 130. The first region corresponds to a process that places emphasis on small latency, such as database access. The second region corresponds to a process that does not place emphasis on small latency, such as periodic backup. Suppose that a free region is to be obtained for another process in the cache 130 in this state. In this case, the region of the cache 130 may be efficiently used by releasing the second region for which the small latency is less important (for example, the priority is lower) among the first and second regions. When a region corresponding to a process whose execution has ended is present in the cache 130, the region may be preferentially released.

Figure 6:
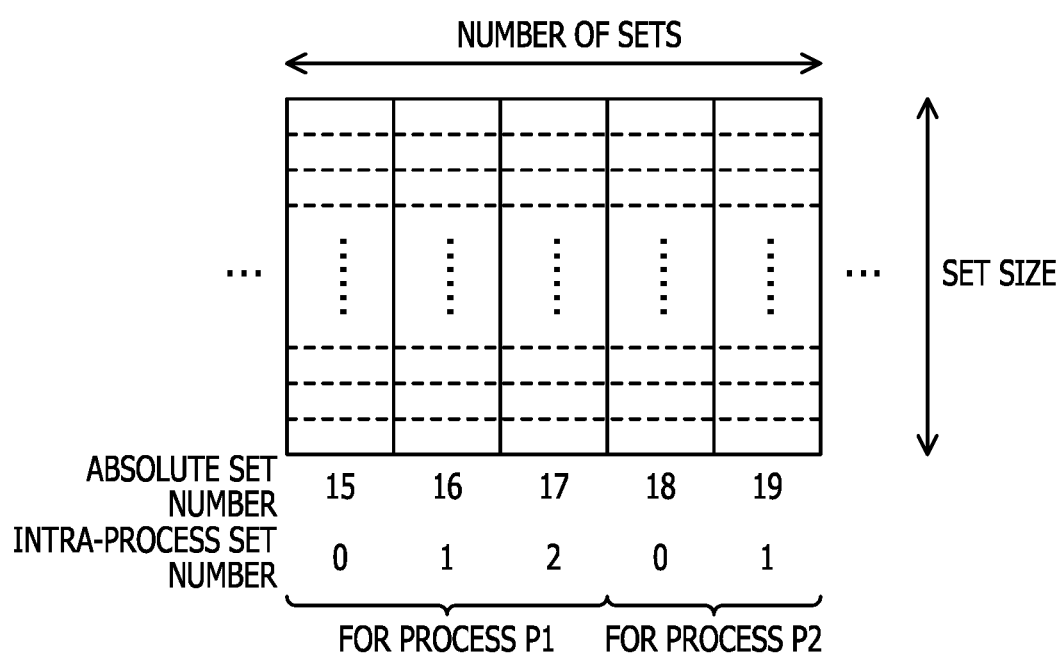
FIG. 6 is a diagram illustrating an example of allocation of sets to processes.

FIG. 6 is a diagram illustrating an example of allocation of sets to processes. As described above, in the present embodiment, the region of the cache 130 is managed in units of sets. Each set includes up to a certain number of lines. For example, the maximum set sizes of individual sets are equal to each other. In the following description, the set size indicates the number of lines in a set.

One or more sets are allocated to each process. In the example of FIG. 6, three sets are allocated to the process P1, and two sets are allocated to the process P2. An absolute set number that is a serial number in the cache 130 is assigned to each set in advance. On the other hand, once sets are allocated to a process, an intra-process set number that is the set number in each process is assigned to each of the allocated sets. In the example of FIG. 6, the intra-process set numbers "0", "1", and "2" for the process P1 are assigned to the sets having the absolute set numbers "15", "16", and "17", respectively. The intra-process set numbers "0" and "1" for the process P2 are assigned to the sets having the absolute set numbers "18" and "19", respectively. As illustrated in FIG. 7 below, a correspondence between the absolute set number and the intra-process set number is managed by the set management information 142.

FIG. 7 is a diagram illustrating a configuration example of the set management information. As illustrated in FIG. 7, the set management information 142 includes a record for each absolute set number. When a process is assigned to a set, an intra-process set number and a process identifier indicating the assigned process are registered in a record corresponding to the absolute set number of the set.

Figure 8:
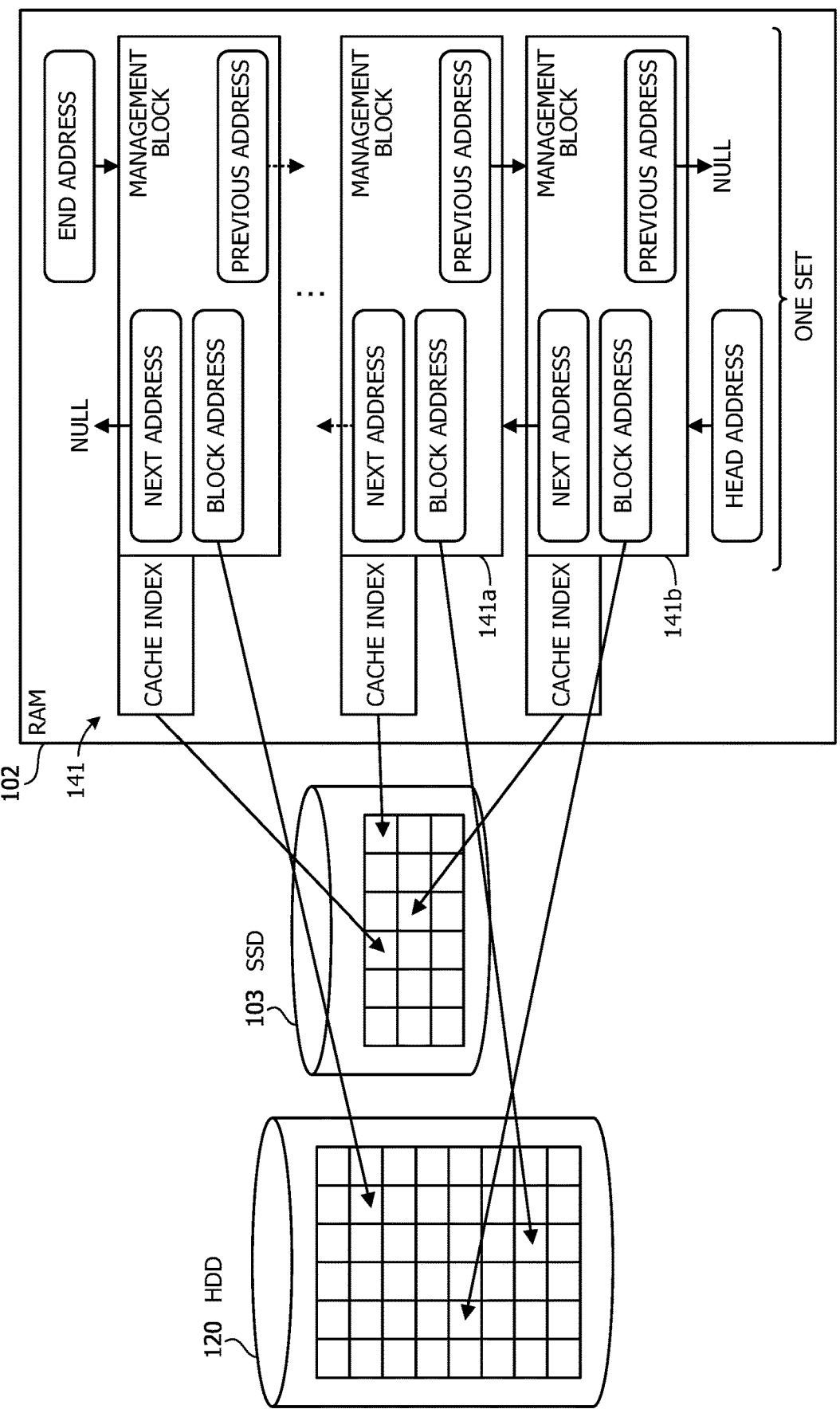
FIG. 8 is a diagram for describing cache management using cache management information.

FIG. 8 is a diagram for describing cache management using the cache management information. As described above, the cache management information 141 includes a management block for each line in the cache 130. In each management block, a cache index indicating a line in the cache 130 is registered in advance.

When a set in the cache 130 is allocated to a process and a data block is stored in a line in the set, a management block corresponding to the line is added to an array of management blocks corresponding to the set. In this state, a block address, a previous address, and a next address are registered in the management block. The block address indicates the address of the data block stored in the corresponding line. The previous address indicates the address (management block address) of another management block located on the head side of the management block in the array. When the management block is located at the head of the array, NULL is registered as the previous address. The next address indicates the address (management block address) of another management block located on the tail side of the management block in the array. When the management block is located at the tail of the array, NULL is registered as the next address.

When a process is assigned to a set, an array corresponding to the set is generated. At this time, a head address and an end address alone are registered in the array. The head address indicates the address of a management block located at the head of the array and is NULL in the initial state. The end address indicates the address of a management block located at the tail of the array and is NULL in the initial state.

When a data block is then stored in a line that is a line belonging to the set and that corresponds to a management block 141a, the management block 141a is added to the array. At this time, the address of the management block 141a is set as the head address and the end address of the array. Both of the previous address and the next address included in the management block 141a are NULL.

It is assumed that a data block is then stored in a line that is a line belonging to the set and that corresponds to a management block 141b. When data blocks in a set are managed in accordance with the least recently used (LRU) method or the first-in/first-out (FIFO) method, a management block corresponding to a newly written data block is added at the head of the set. For example, the address of the management block 141b is set as the head address of the array, and NULL is set as the previous address included in the management block 141b. The address of the management block 141a is set as the next address included in the management block 141b, and the address of the management block 141b is set as the previous address included in the management block 141a. In this manner, the array of the management blocks corresponding to the set is registered in the cache management information 141.

Cache-data purging control is performed for each set. Management is performed in each set such that the purging order becomes higher toward the tail side of the set. As described above, in either case of the LRU method or the FIFO method, when a new data block is stored in a set, the data block is stored at the head of the set. For example, a management block corresponding to a line that stores the data block is added to the head of the array corresponding to the set. In a case where management is performed in accordance with the LRU method, when a cache hit occurs for any of data blocks in a set, a management block corresponding to a line storing the data block is relocated to the head of the array corresponding to the set.

A set serving as the storage destination of a data block is uniquely determined from the number of sets allocated to a process and the block address of the data block. Therefore, as illustrated in FIG. 9 below, when a cache hit or miss is determined in response to a request for reading a data block, a set is identified from the number of sets and the block address and it is determined whether the target data block is stored in the identified set.

Figure 9:
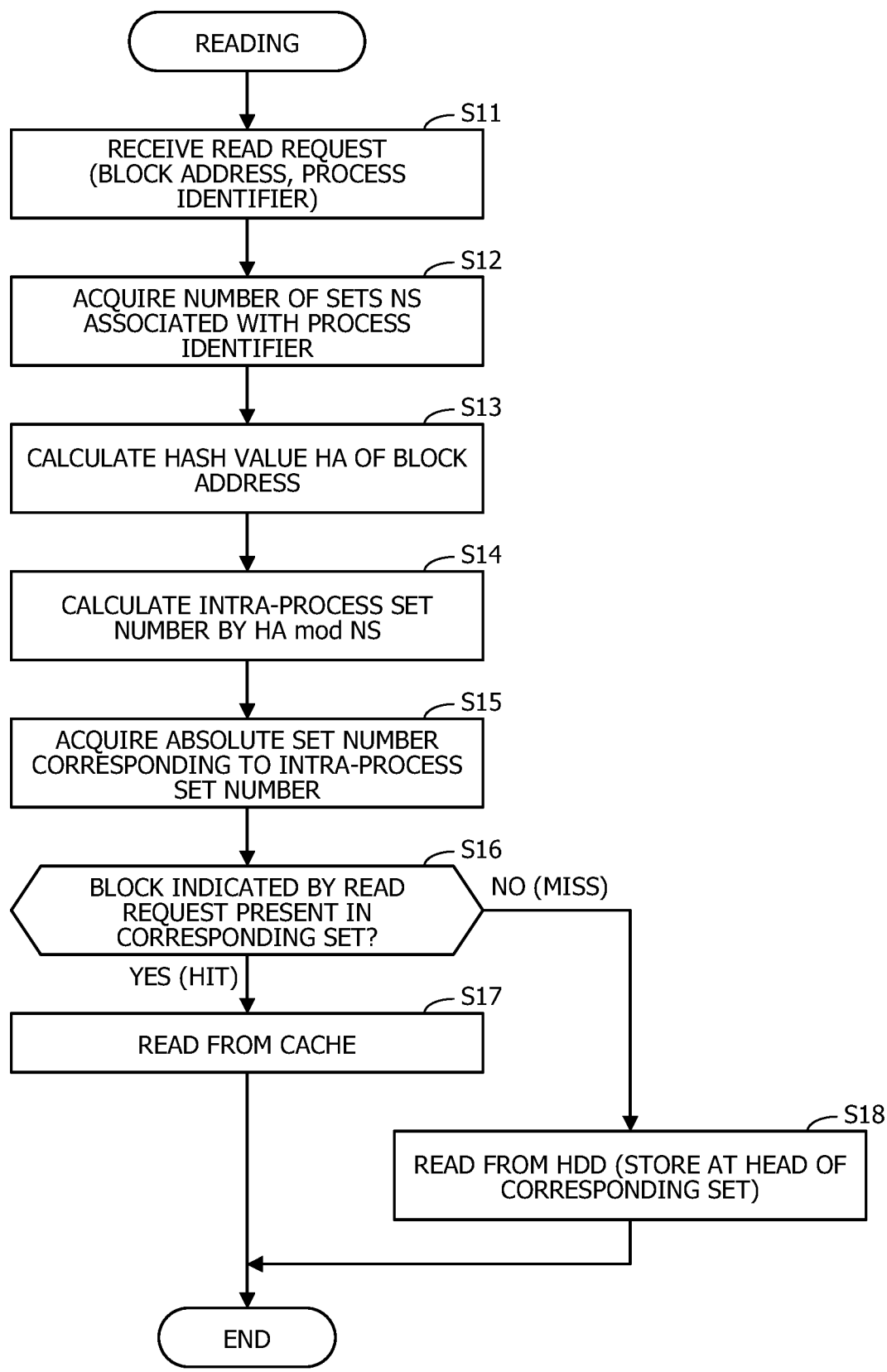
FIG. 9 is an example of a flowchart illustrating data reading processing using a cache.

FIG. 9 is an example of a flowchart illustrating data reading processing using a cache.

[Step S11] The I/O reception unit 121 receives a read request from any of the applications 111, 112, and so on. At this time, the block address of a reading-target data block and the process identifier indicating a reading-source process are designated.

[Step S12] The cache control unit 122 refers to the set management information 142 and acquires the number of sets NS associated with the designated process identifier.

[Step S13] The cache control unit 122 calculates a hash value HA of the designated block address.

[Step S14] The cache control unit 122 calculates an intra-process set number corresponding to the block address by performing a remainder calculation "HA mod NS". For example, a remainder obtained by dividing the hash value HA by the number of sets NS is calculated as the intra-process set number corresponding to the block address.

[Step S15] The cache control unit 122 refers to the set management information 142 and acquires the absolute set number associated with the designated process identifier and with the intra-process set number calculated in step S14.

[Step S16] The cache control unit 122 refers to an array corresponding to the set indicated by the absolute set number acquired in step S15 among the arrays of the management blocks included in the cache management information 141. The cache control unit 122 determines whether or not a management block in which the designated block address is registered is present in the array that is referred to (for example, whether the data block indicated by the read request is present in the corresponding set). When the corresponding management block is present, a cache hit occurs. The processing then proceeds to step S17. When the corresponding management block is not present, a cache miss occurs. The processing proceeds to step S18.

[Step S17] The cache control unit 122 reads the data block indicated by the read request from the set indicated by the absolute set number acquired in step S15 among the sets in the cache 130, and transmits via the I/O reception unit 121 the data block to the application that is the sender of the read request.

[Step S18] Based on an instruction from the cache control unit 122, the I/O processing unit 123 reads the data block indicated by the read request from the HDD 210, and transmits, via the cache control unit 122 and the I/O reception unit 121, the data block to the application that is the sender of the read request. The cache control unit 122 stores the data block read from the HDD 210 in the head line of the set indicated by the absolute set number acquired in step S15.

Processing of reducing the number of sets allocated to a process will be described next. For example, there may be a case where, when a new process is generated in a state in which the number of free sets is small, free sets are desired to be created by reducing the number of sets already allocated to an existing process in order to allocate the sets to the new process.

Figure 10:
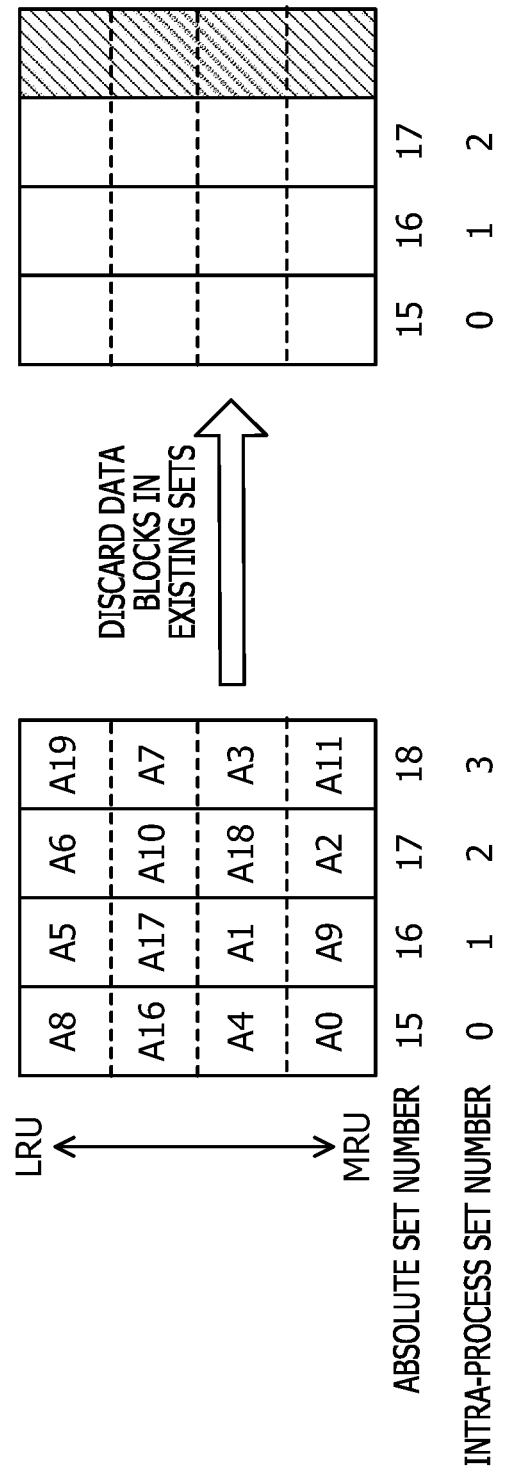
FIG. 10 is a diagram illustrating a first comparative example of number-of-sets reduction processing.
Figure 11:
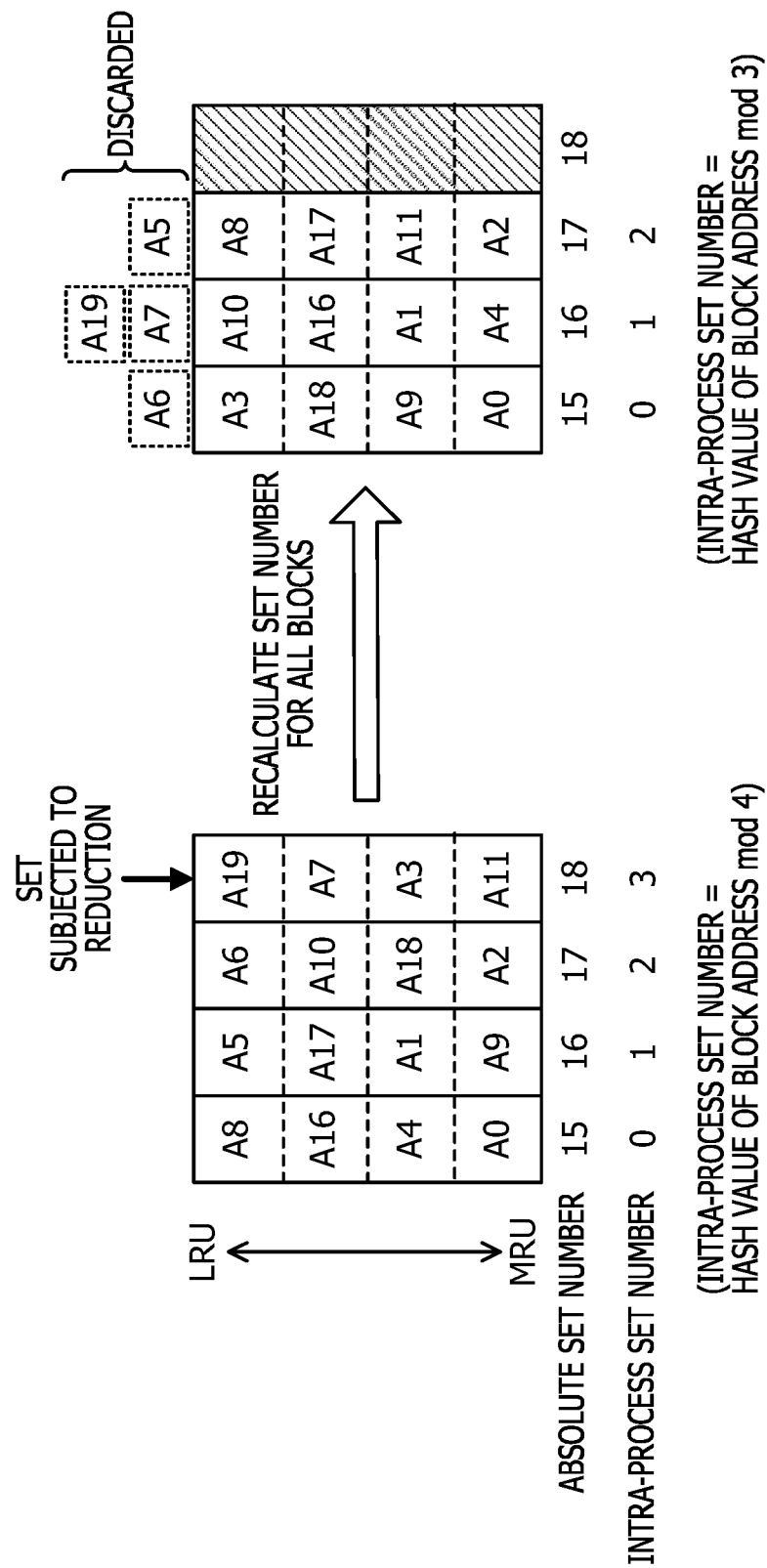
FIG. 11 is a diagram illustrating a second comparative example of the number-of-sets reduction processing.

FIGS. 10 and 11 below illustrate comparative examples of number-of-sets reduction processing performed in such a case. It is assumed in FIGS. 10 and 11 that from a state in which four sets having the absolute set numbers "15" to "18" are allocated to a certain process, the number of sets allocated to the process is reduced to "3" by releasing the set having the absolute set number "18".

FIG. 10 is a diagram illustrating a first comparative example of the number-of-sets reduction processing. As illustrated in FIG. 10, as one method, a method of discarding data blocks stored in sets before the number of sets is reduced and, from that state, starting I/O control using a reduced number of sets is conceivable. In this case, with the start of the I/O control, the data blocks are loaded again to the reduced number of sets. However, with this method, latency in response to an I/O request from the existing process greatly deteriorates. For example, in this case, it is highly probable that many I/O requests also occur from the new process. Thus, it is highly probable that latency deteriorates for both the existing process and the new process.

FIG. 11 is a diagram illustrating a second comparative example of the number-of-sets reduction processing. In the example of FIG. 11, an increase in latency in response to an I/O request from the existing process is suppressed by leaving the data blocks originally stored in the sets before the reduction as much as possible. In this processing, for every data block stored in the sets before the reduction, a set serving as the storage destination (allocation destination) after the reduction is determined by a remainder calculation that uses the number of sets (three) after the reduction and the hash value of the block address. The data blocks located on the head side in the individual sets before the reduction are preferentially left in sets after the reduction.

As a result, data blocks A5, A6, A7, and A19 stored on the tail side in the sets among the data blocks stored in the sets before the reduction overflow from the sets and are discarded. However, the other data blocks are left in the sets continuously used after the reduction. For the lines storing the data blocks that are left, merely the allocation destinations of the corresponding management blocks to the sets and the positions in the arrays are changed. Thus, the data blocks themselves are not to be stored again. Therefore, latency in response to an I/O request deteriorates because some of the data blocks are discarded but the latency may be significantly improved compared with that of the example in FIG. 10.

However, in this method, the remainder calculation for determining the storage-destination set for every data block is to be performed. Therefore, this method involves an issue in that the calculation load for determining the storage-destination set is heavy. As a result, for example, it takes time to complete the number-of-allocated-set reduction processing and to restart I/O processing for the corresponding process. The calculation processing load may adversely affect latency in response to an I/O request from another process that is being executed.

Accordingly, by providing rules for the number of sets allocated to a process and the number of allocated sets to be reduced, the server apparatus 100 according to the second embodiment simplifies the calculation of the storage-destination sets of the data blocks after the reduction and reduces the calculation load. For example, when reduction of the number of allocated sets is permitted, the number of sets allocated to a single process is a multiple of a natural number of 2 or greater. The number of allocated sets after the reduction is a divisor of the number of allocated sets before the reduction.

Figure 12:
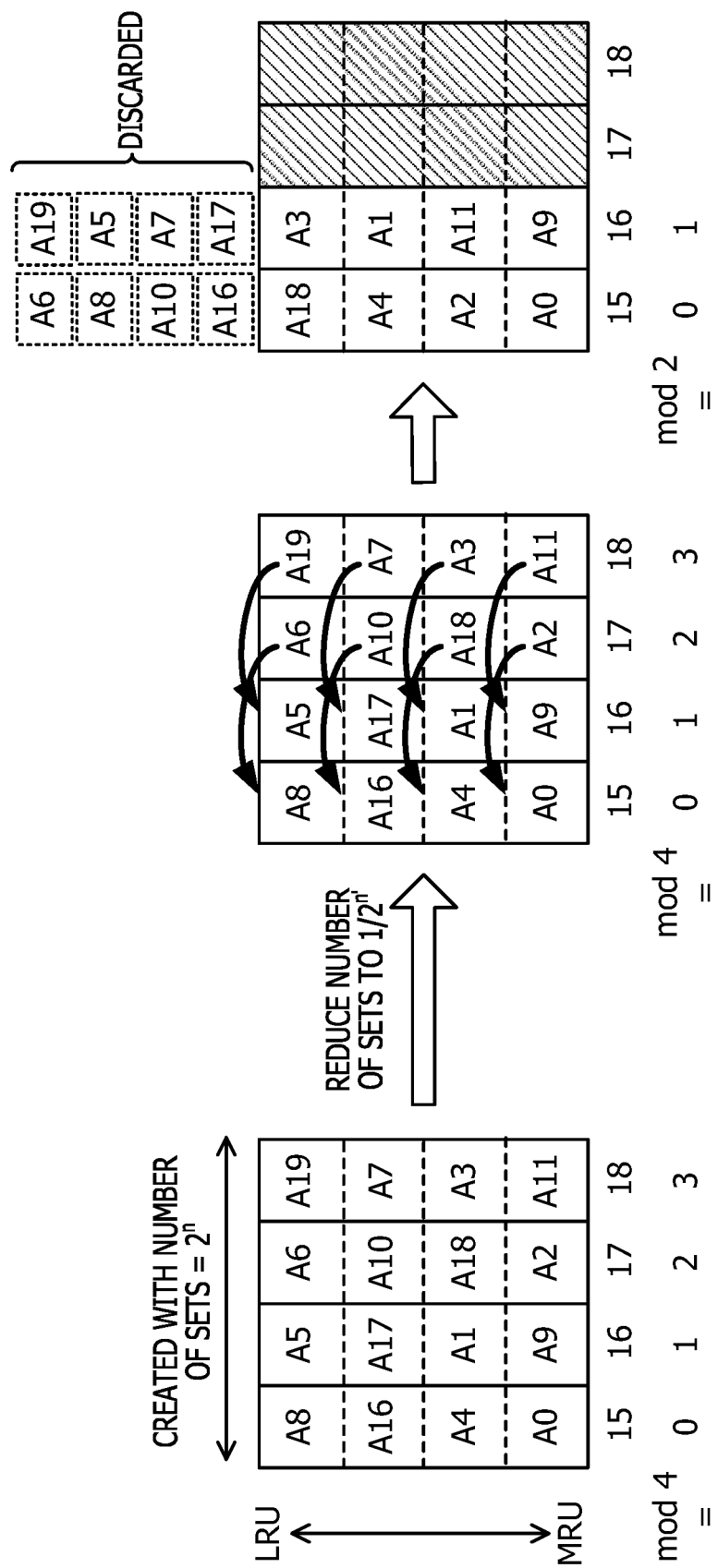
FIG. 12 is a diagram illustrating a first processing example of set allocation and reduction.

FIG. 12 is a diagram illustrating a first processing example of set allocation and reduction. In the first processing example, when sets are allocated to a process, the number of sets is equal to $2^n$ (where n is a natural number of 2 or greater). In the example of FIG. 12, n is equal to 2 (n=2). Thus, four sets are allocated to a process. For example, four sets having the absolute set numbers "15" to "18" are allocated to a process. The sets having the absolute set numbers "15" to "18" are assigned the intra-process set numbers "0" to "3", respectively.

From this state, the number of sets is reduced to $\frac{1}{2}^{n'}$ (where n' is a natural number smaller than n). In the example of FIG. 12, n' is equal to 1 (n'=1). Thus, the sets allocated to the process are changed to two sets having the absolute set numbers "15" and "16". It is assumed that the sets having the absolute set numbers "15" and "16" are assigned the intra-process set numbers "0" and "1", respectively, at this time. In the following description, a set having the intra-process set number "X" is referred to as a set "X".

The sets serving as, after the reduction, the storage destinations (allocation destinations) of the data blocks stored in the individual sets before the reduction are determined based on the number of sets, which is "2", continuously used after the reduction and based on the positional relationships between the sets before and after the reduction. For example, sets for which the storage destination after the reduction is the set "0" are identified by selecting sets from among the sets allocated before the reduction at an interval of "2", which is the number of sets after the reduction, with respect to the same set "0" serving as the origin. For example, the corresponding sets are the sets "0" and "2". Sets for which the storage destination after the reduction is the set "1" are identified by selecting sets from among the sets allocated before the reduction at an interval of "2", which is the number of sets after the reduction, with respect to the same set "1" serving as the origin. For example, the corresponding sets are the sets "1" and "3".

To the set "0" continuously used after the reduction, data blocks are selected and stored (allocated) one by one from the individual sets "0" and "2" used before the reduction in ascending order of the purging order. For example, data blocks are allocated to the set "0" used after the reduction in an order of A0, A2, A4, A18, A16, A10, A8, and A6. However, the data blocks A16, A10, A8, and A6 that overflow from the set "0" are discarded. For example, lines for the data blocks A16, A10, A8, and A6 are released from the set and become unused lines. On the other hand, for each of the lines storing the data blocks A0, A2, A4, and A18, the corresponding management block is re-assigned to the array corresponding to the set "0".

Similarly, to the set "1" continuously used after the reduction, data blocks are selected and stored (allocated) one by one from the individual sets "1" and "3" used before the reduction in ascending order of the purging order. For example, data blocks are allocated to the set "1" used after the reduction in an order of A9, A11, A1, A3, A17, A7, A5, and A19. However, the data blocks A17, A7, A5, and A19 that overflow from the set "1" are discarded. For example, lines for the data blocks A17, A7, A5, and A19 are released from the set and become unused lines. On the other hand, for each of the lines storing the data blocks A9, A11, A1, and A3, the corresponding management block is re-assigned to the array corresponding to the set "1".

Through the above processing, allocation of the data blocks (lines) to the sets "0" and "1" used after the reduction is completed, and the sets "2" and "3" are released and become unused sets.

According to the above-described processing, the number of sets initially allocated to a process is to $2^n$ and, when the number of sets is reduced, the number of sets after the reduction is set to $½^{n'}$. Thus, the processing of determining the storage destination of each data block is simplified. For example, the sets serving as, after the reduction, the storage destinations (allocation destinations) of the data blocks stored in the individual sets before the reduction are determined based on the number of sets continuously used after the reduction and the positional relationships between the sets before and after the reduction. Thus, complicated calculations such as a calculation of a hash value of the address and a remainder calculation are no longer performed for determining the storage-destination set. The storage-destination set is determined not in units of data blocks (lines) but in units of sets used before the reduction. Therefore, as compared with the method illustrated in FIG. 11, the calculation processing load for determining the storage destination may be reduced and the time taken for the determination may be shortened.

Figure 13:
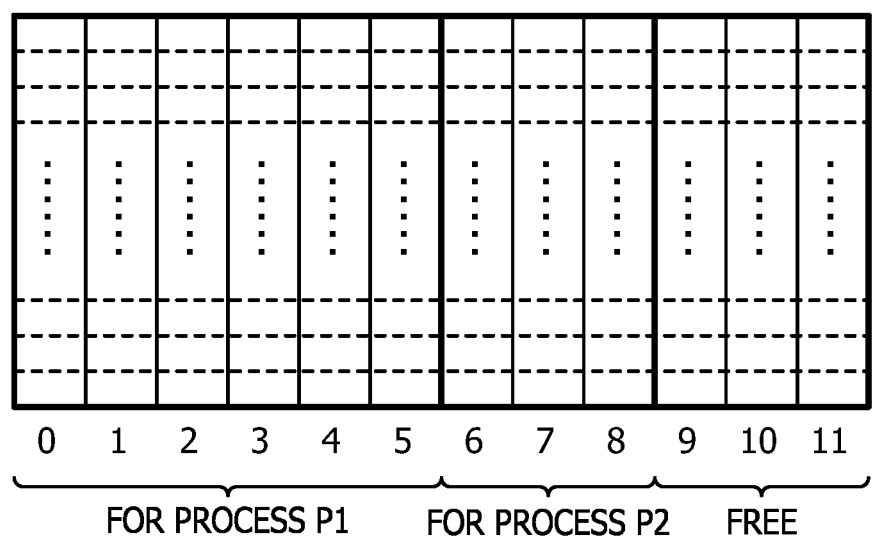
FIG. 13 is a diagram illustrating a second processing example of set allocation and reduction.

FIG. 13 is a diagram illustrating a second processing example of set allocation and reduction. In the second processing example, when sets are allocated to a process, the number of sets is equal to $a·m^n$ (where a is a natural number, m is a natural number of 2 or greater, and n>0). In addition, a and m may be arbitrarily set for each process. When the number of allocated sets is reduced, the number of sets is reduced to $1/m^{n'}$ or $1/a$ of the original number of allocated sets.

In the example illustrated in FIG. 13, n=1, a=3, and m=2 are set for the process P1. Thus, six sets having the absolute set numbers "0" to "5" are allocated to the process P1. Also, n=1, a=1, and m=3 are set for the process P2. Thus, three sets having the absolute set numbers "6" to "8" are allocated to the process P2. Sets having the absolute set numbers "9" to "11" are free sets.

In this case, for both the processes P1 and P2, when the number of allocated sets is reduced, the number of sets may be reduced to $1/m^{n'}$ or $1/a$ of the original number of sets. Which reduction method is to be used may be arbitrarily selected for each process. When the former method is adopted, the value of n' may also be arbitrarily set for each process. In either case, as in the example of FIG. 12, the sets serving as, after the reduction, the storage destinations (allocation destinations) of the data blocks stored in the individual sets before the reduction are determined based on the number of sets continuously used after the reduction and the positional relationships between the sets before and after the reduction.

For example, it is assumed that the number of sets allocated to the process P1 is reduced to $1/a=⅓$ of the original number of sets. It is assumed in this example that the intra-process set numbers "0" to "5" are assigned to the sets having the absolute set numbers "0" to "5" before the reduction, respectively. It is also assumed that, from this state, the allocated sets are changed to the sets having the absolute set numbers "0" and "1" and the intra-process set numbers "0" and "1" are assigned to the sets having the absolute set numbers "0" and "1", respectively, after the number of sets is reduced.

In this case, for example, sets for which the storage destination after the reduction is the set "0" are identified by selecting sets from among the sets allocated before the reduction at an interval of "2", which is the number of sets after the reduction, with respect to the same set "0" serving as the origin. For example, the corresponding sets are the sets "0", "2", and "4". To the set "0" continuously used after the reduction, data blocks are selected and stored (allocated) one by one from the individual sets "0", "2", and "4" used before the reduction in ascending order of the purging order. The data blocks that overflow from the set "0" are discarded, and the lines for these data blocks are released from the set.

On the other hand, for the process P2, for example, the number of allocated sets may be reduced to $⅓^1$ of the original number of sets. In this case, the number of sets to be allocated to the process P2 after the reduction is "1".

As described above, rules (number-of-sets management policies) for the number of initially allocated sets and the number of sets to be reduced may be arbitrarily set for each process. Thus, for example, a set may be flexibly allocated to a process in accordance with the characteristics or the like of the process.

In FIG. 12 described above, the number of sets initially allocated to the process is equal to $2^n$. This corresponds to a case where a=1 and m=2 in the example of FIG. 13.

Figure 14:
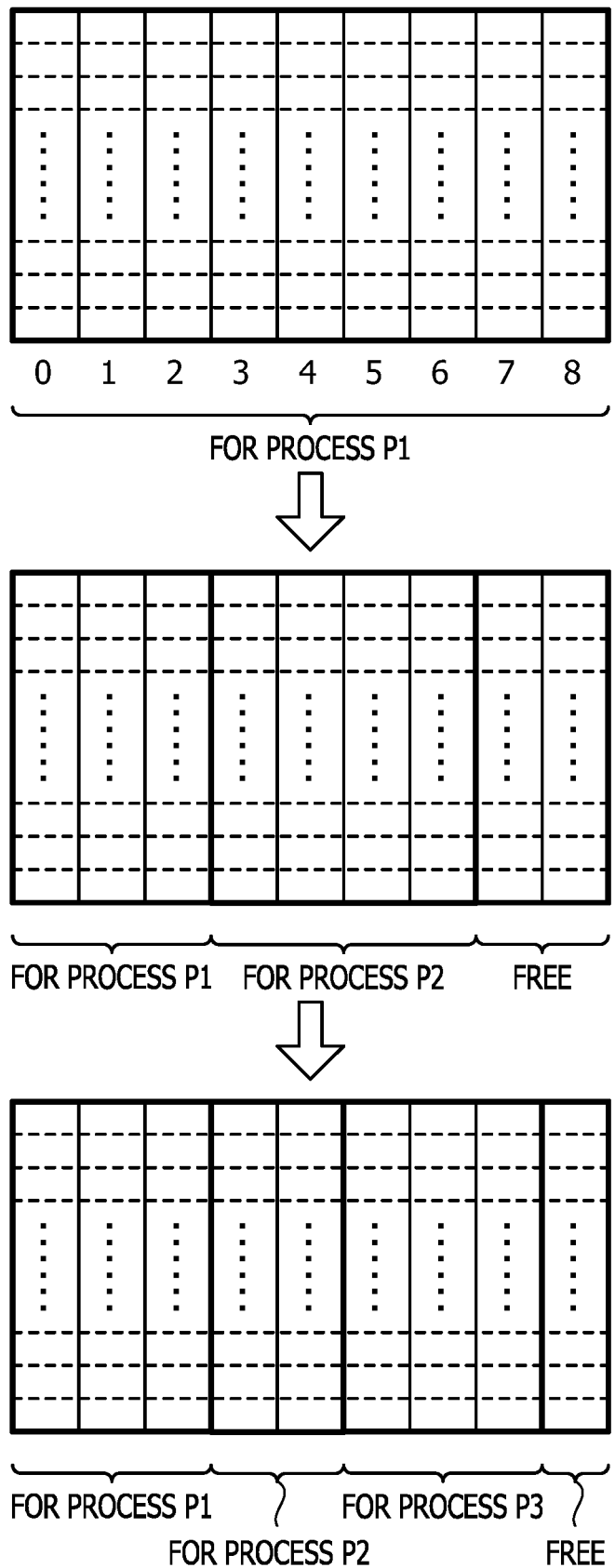
FIG. 14 is a diagram illustrating a third processing example of set allocation and reduction.

FIG. 14 is a diagram illustrating a third processing example of set allocation and reduction. FIG. 14 illustrates another example of a case where the number-of-sets management policies are changed for each process.

As illustrated in the upper part of FIG. 14, it is assumed that individual sets having the absolute set numbers "0" to "8" are allocated to the process P1. In this case, the number of allocated sets is, for example, $1×3^2=9$. For example, n=2, a=1, and m=3 are set for the process P1.

It is assumed that in order to allocate sets to the process P2, the number of sets allocated to the process P1 is reduced thereafter. In this case, as illustrated in the middle part of FIG. 14, the state changes to a state in which the number of sets allocated to the process P1 is reduced to $⅓^1$ of the original number of sets and three sets having the absolute set numbers "0" to "2" are allocated to the process P1. At this time, the sets having the absolute set numbers "3" to "8" are in the free state. It is assumed that from this state, the individual sets having the absolute set numbers "3" to "6" are allocated to the process P2. In this case, the number of allocated sets is, for example, $1×2^2=4$. For example, n=2, a=1, and m=2 are set for the process P2.

In order to allocate sets to the process P3, the allocated sets are released thereafter. When the process P1 has a higher cache use priority than the process P2, the number of sets allocated to the process P2 is reduced. In this case, as illustrated in the lower part of FIG. 14, the state changes to the state in which the number of sets allocated to the process P2 is reduced to $½^1$ of the original number of sets and two sets having the absolute set numbers "3" and "4" are allocated to the process P2. It is assumed that individual sets having the absolute set numbers "5" to "7" are allocated to the process P3. In this case, the number of allocated sets is, for example, $1×3^1=3$. For example, n=1, a=1, and m=3 are set for the process P3.

Figure 15:
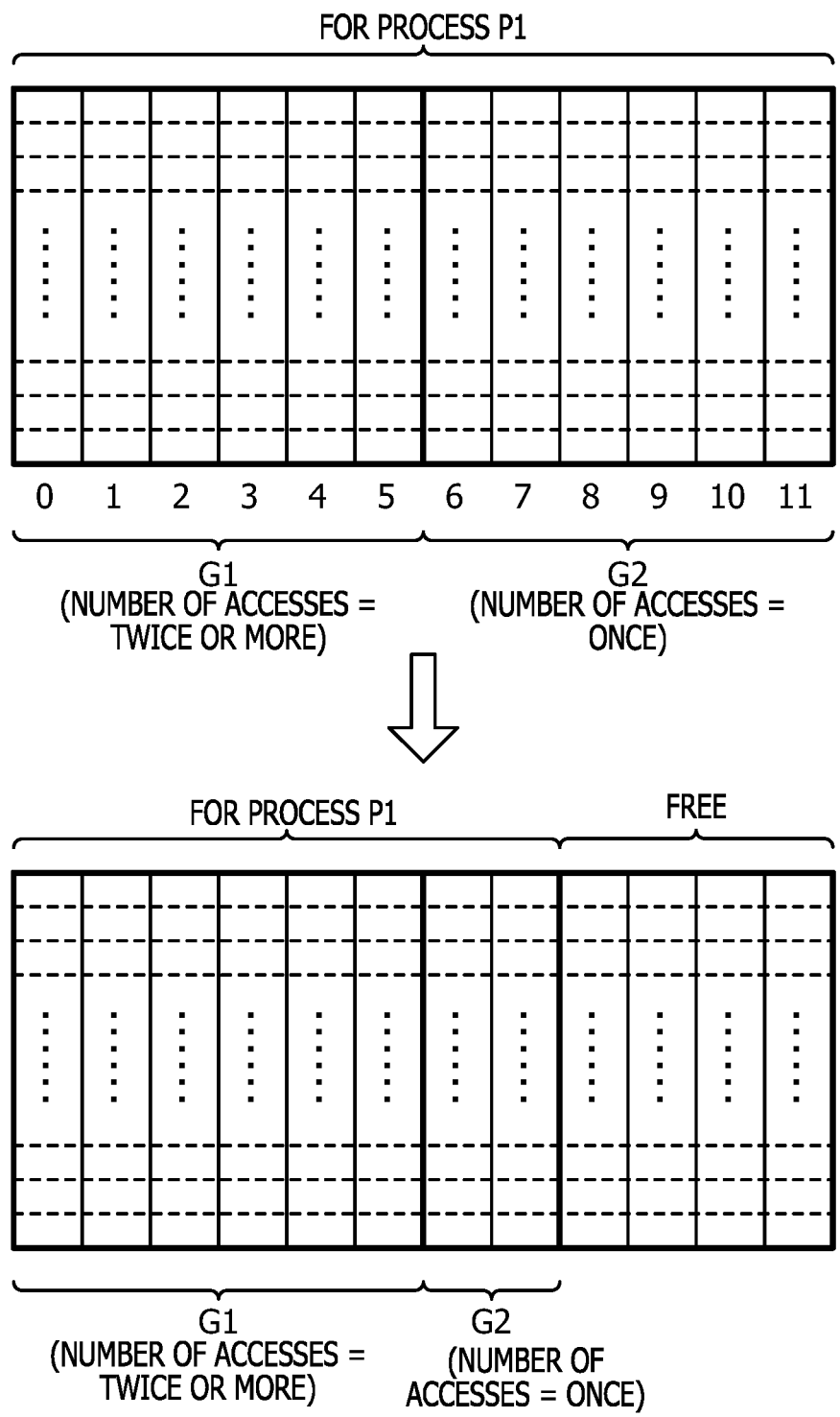
FIG. 15 is a diagram illustrating a fourth processing example of set allocation and reduction.

FIG. 15 is a diagram illustrating a fourth processing example of set allocation and reduction. A plurality of set groups may be allocated to the same process, and allocation management may be independently performed for each set group. For example, there is a difference in access frequency between data blocks that are accessed from the same process and are stored in the cache. Accordingly, in the example of FIG. 15, data blocks having high access frequencies and data blocks having low access frequencies are managed using different set groups.

In the example illustrated on the upper side in FIG. 15, sets allocated to the process A are separated into a set group G1 and a set group G2. Each of the set groups G1 and G2 includes six sets. The set group G1 stores data blocks for which the number of accesses is twice or more. On the other hand, the set group G2 stores data blocks for which the number of accesses is once.

In this case, it is considered that the data blocks included in the set group G1 involve a higher cache use priority than the data blocks included in the set group G2. Thus, when free sets are to be obtained in the cache, the number of allocated sets is reduced preferentially from the set group G2 over the set group G1. The number-of-sets management policies may be set such that the number of sets is reduced more for the set group G2 than for the set group G1. For example, when the number of allocated sets of the set group G1 is reduced, the number of allocated sets is reduced to ½ of the original number of sets. On the other hand, when the number of allocated sets of the set group G2 is reduced, the number of allocated sets is reduced to ⅓ of the original number of sets. With such processing, it is possible to obtain free sets for another process as a result of reducing the number of sets allocated to the process P1, while suppressing deterioration of latency in response to an I/O request by the process P1.

In the example illustrated on the lower side in FIG. 15, the number of sets of the set group G2 is reduced to ⅓ of the original number of sets, and the number of sets is equal to "2".

Processing of allocating sets to a process will be described with reference to flowcharts.

Figure 16:
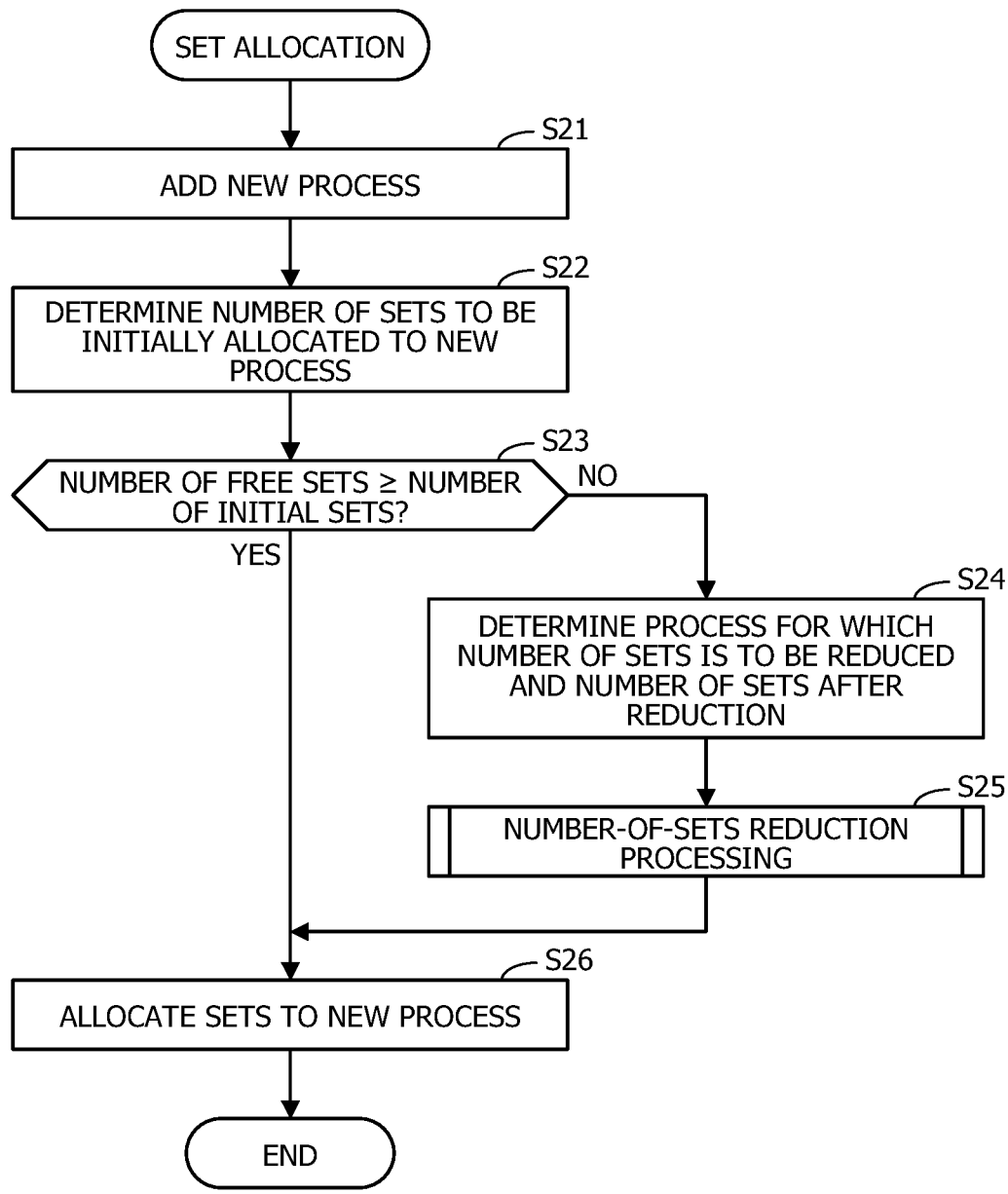
FIG. 16 is an example of a flowchart illustrating processing of allocating sets to a process.

FIG. 16 is an example of a flowchart illustrating processing of allocating sets to a process.

[Step S21] The cache control unit 122 detects addition of a new process (process to which sets are yet to be allocated). The processing then proceeds to step S22.

[Step S22] The cache control unit 122 determines the number of sets to be initially allocated to the new process. When the number of initial sets is given by $a \cdot m^n$, for example, the setting values of a, m, and n are determined in advance for each process. In this case, the cache control unit 122 determines the number of initial sets, based on the setting values of a, m, and n determined for the new process.

[Step S23] The cache control unit 122 determines whether the number of currently free sets in the cache 130 is greater than or equal to the number of initial sets determined in step S22. If the number of free sets is greater than or equal to the number of initial sets, the processing proceeds to step S26. If the number of free sets is less than the number of initial sets, the processing proceeds to step S24.

[Step S24] The cache control unit 122 determines a process for which the number of allocated sets is to be reduced from among the processes to which sets are already allocated, and determines the number of sets to be allocated to the process after the reduction. In this processing, for example, a process is selected and determined that has a lower cache use priority than the new process and that enables, after the reduction of the number of sets based on the number-of-sets management policies, as many free sets as the number of initial sets of the new process are obtained within the entire cache 130.

[Step S25] The cache control unit 122 performs processing of reducing the number of allocated sets for the process determined in step S24.

[Step S26] The cache control unit 122 selects as many sets as the number of initial sets determined in step S22 from among the free sets, and allocates the selected sets to the new process.

Figure 17:
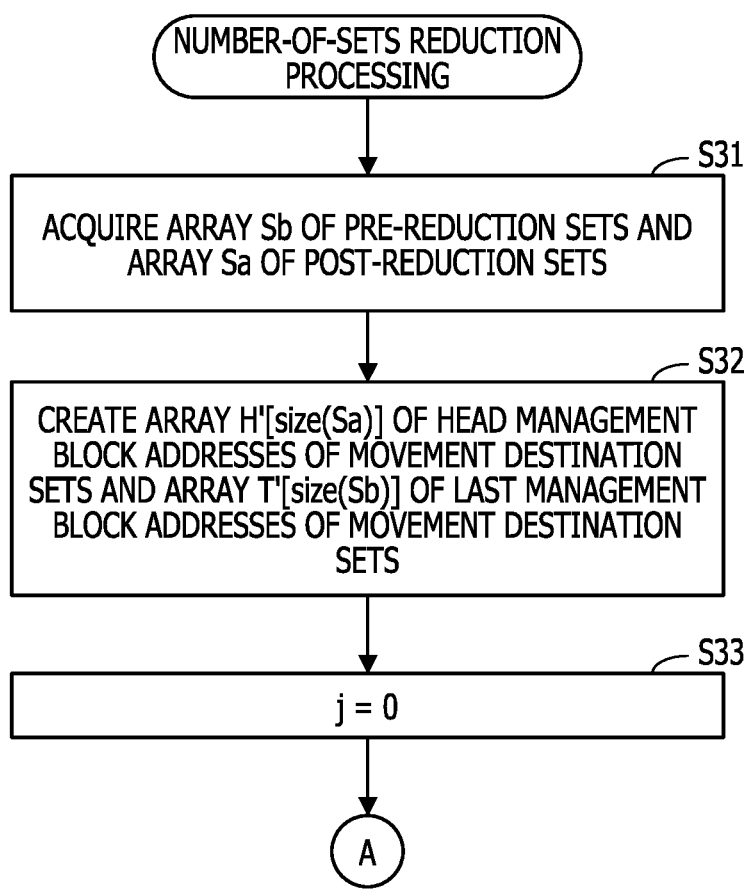
FIG. 17 is an example (part 1) of a flowchart illustrating the number-of-sets reduction processing.
Figure 18:
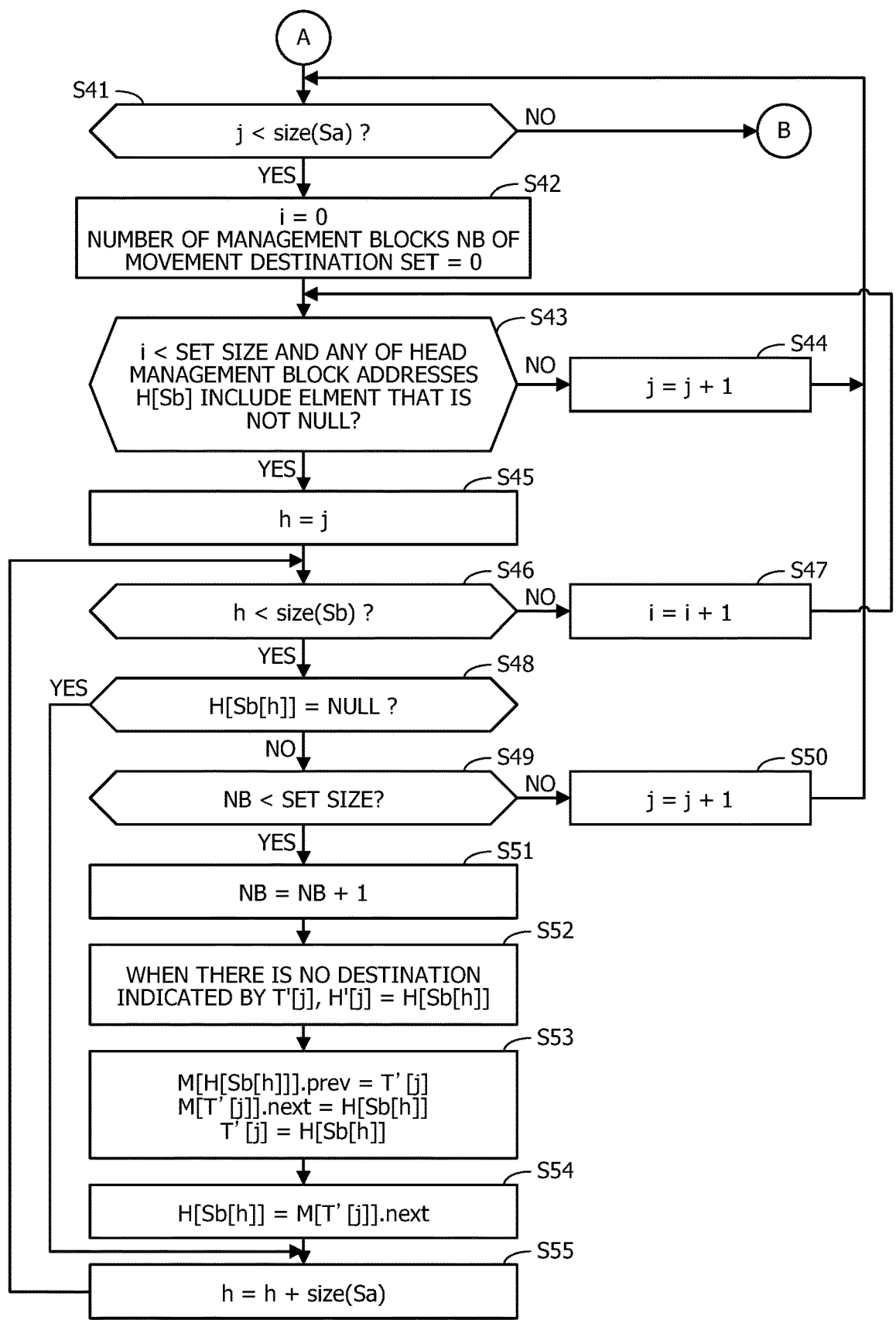
FIG. 18 is an example (part 2) of the flowchart illustrating the number-of-sets reduction processing.
Figure 19:
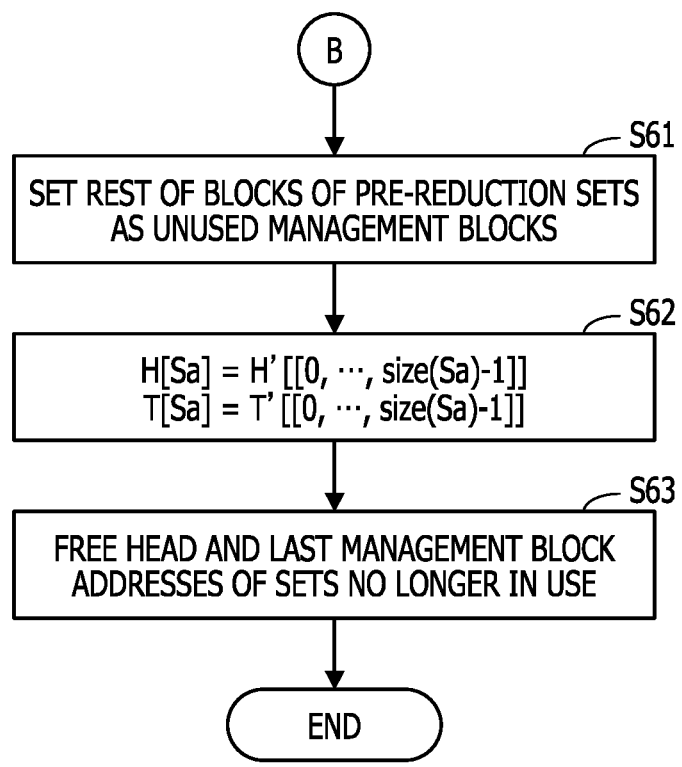
FIG. 19 is an example (part 3) of the flowchart illustrating the number-of-sets reduction processing.

FIGS. 17 to 19 are examples of flowcharts illustrating the number-of-sets reduction processing. The processing of FIGS. 17 to 19 corresponds to the processing of step S25 of FIG. 16.

[Step S31] The cache control unit 122 acquires an array Sb of the absolute set numbers of the sets (pre-reduction sets) allocated before the reduction of the number of sets. This array Sb includes as many absolute set numbers as the number of pre-reduction sets. The cache control unit 122 acquires an array Sa of absolute set numbers of the sets (post-reduction sets) allocated after the reduction of the number of sets.

[Step S32] Separately from the actual post-reduction sets in the cache 130, "movement destination sets" corresponding to the post-reduction sets are created as temporary information for operation. The cache control unit 122 creates an array H'[size(Sa)] of addresses of the head management blocks of the movement destination sets and an array T'[size(Sb)] of addresses of the last management blocks of the movement destination sets.

[Step S33] The cache control unit 122 resets, to 0, a variable j that indicates the number (intra-process set number) assigned to the processing-target set in the movement destination sets.

Description is continued below by using FIG. 18.

[Step S41] The cache control unit 122 determines whether the variable j is smaller than size(Sa) that indicates the number of movement destination sets. If the variable j is smaller than size(Sa), the processing proceeds to step S42. If the variable j becomes equal to size(Sa), the processing proceeds to step S61 in FIG. 19.

[Step S42] The cache control unit 122 resets, to 0, a variable i that indicates the number (serial number from the head) of the processing-target management block in the pre-reduction set. The cache control unit 122 resets, to 0, a variable NB indicating the number (serial number from the head) of the processing-target management block in the movement destination set.

[Step S43] The cache control unit 122 determines whether both conditions 1 and 2 below are satisfied. If both the conditions 1 and 2 are satisfied, the processing proceeds to step S45. If at least one of the conditions 1 and 2 is not satisfied, the processing proceeds to step S44.

(Condition 1) The variable i is smaller than a set size (the maximum number of management blocks in the set).

(Condition 2) In an array H[Sb] of the addresses of the head management blocks of the respective movement destination sets, any of the addresses of Sb(g) that satisfies "g mod size(Sa)=j" (the pre-reduction set corresponding to the j-th movement destination set) includes an element that is not NULL.

[Step S44] The cache control unit 122 increments the variable j. The processing then proceeds to step S41.

When the condition (1) of step S43 is not satisfied, the processing for as many management blocks as the set size included in the j-th movement destination set is finished (as many management blocks as the upper limit number are already allocated to the movement destination set). Thus, the processing-target movement destination set is changed to the next set. When the condition (2) of step S43 is not satisfied, no management block is allocated to the processing-target pre-reduction set (no data block is stored in the set). Thus, the processing-target movement destination set is changed to the next set.

[Step S45] The cache control unit 122 sets the variable j to a variable h that indicates the number (the intra-process set number) of the processing-target pre-reduction set.

[Step S46] The cache control unit 122 determines whether the variable h is less than size(Sb) that indicates the number of pre-reduction sets. If the variable h is less than size(Sb), the processing proceeds to step S48. If the variable h becomes equal to size(Sb), the processing proceeds to step S47.

[Step S47] The case where No is determined in step S46 is the case where the processing is finished up to the last set of the pre-reduction sets whose allocation destination is the j-th movement destination set after the reduction of the number of sets. In this case, the cache control unit 122 increments the variable i and changes the processing-target management block in the set toward the tail side by one. The processing then proceeds to step S43.

[Step S48] The cache control unit 122 determines whether or not the address H[Sb[h]] of the head management block in an h-th pre-reduction set is NULL. When the address is not NULL, the processing proceeds to step S49. When the address is NULL, the processing proceeds to step S55. The latter case is the case where there is no management block (no data block is stored) in the processing-target pre-reduction set.

[Step S49] The cache control unit 122 determines whether or not the variable NB is less than the set size. When the variable NB is less than the set size, the processing proceeds to step S51. When the variable NB becomes equal to the set size, the process proceeds to step S50.

[Step S50] The case where No is determined in step S49 is the case where the processing is finished for all the management blocks included in the h-th pre-reduction set. In this case, the cache control unit 122 increments the variable j and changes the processing-target movement destination set to the next set.

[Step S51] The cache control unit 122 increments the variable NB.

[Step S52] If there is no destination indicated by T'[j] which indicates the last management block of the j-th movement destination set, for example, if the processing is the first processing for this movement destination set, the cache control unit 122 sets H[Sb[h]] that indicates the head management block in the h-th pre-reduction set, as H'[j] that indicates the head management block of this movement destination set. Consequently, the head management block in the h-th pre-reduction set is added at the head of the movement destination set.

[Step S53] The cache control unit 122 performs address re-assigning processing for the movement destination set. First, the cache control unit 122 sets the address (T'[j]) of the last management block of the movement destination set, as the previous address (M[H[Sb[h]].prev) included in the head management block of the pre-reduction set. The cache control unit 122 sets the address (H[Sb[h]]) of the head management block of the pre-reduction set, as the next address (M[T'[j]].next) included in the last management block of the movement destination set. The cache control unit 122 sets the address (H[Sb[h]]) of the head management block of the pre-reduction set, as the address (T'[j]) of the last management block of the movement destination set. Through such processing, the head of the pre-reduction set is linked to the end of the movement destination set and the block number indicating the end of the movement destination set is updated.

[Step S54] The cache control unit 122 performs address re-assigning processing for the pre-reduction set. For example, the cache control unit 122 sets the next address (M[T'[j]].next) included in the last management block of the movement destination set, as the address (H[Sb[h]]) of the head management block of the pre-reduction set. Consequently, the next address of the last management block of the movement destination set is set in the head management block of the pre-reduction set. In this manner, the management block of the pre-reduction set for which the processing is finished is separated.

[Step S55] The cache control unit 122 adds size(Sa), which indicates the number of post-reduction sets, to the variable h. Consequently, the pre-reduction set whose allocation destination is the processing-target movement destination set is changed to the next set in accordance with the number of post-reduction sets. The processing then proceeds to step S46.

In the processing of FIG. 18 described above, the processing-target movement destination set is selected by the variable j and the processing-target pre-reduction set is selected by the variable h. Through the processing in steps S46, S48, S49, and S51 to S54, the head management block in the pre-reduction set is moved to the head of the movement destination set. Subsequently in step S55, the next pre-reduction set whose allocation destination is the processing-target movement destination set is selected, and steps S46, S48, S49, and S51 to S54 are performed in the similar manner. Consequently, the head management block in the selected pre-reduction set is moved to the head of the movement destination set.

Once the processing is performed for the pre-reduction sets whose allocation location is the processing-target movement destination set, No is determined in step S46 and the processing-target management block is moved toward the tail side of the set by one. As a result of the processing similar to the above being performed, the next management block is linked to the tail side of the movement destination set one by one from each of the pre-reduction sets whose allocation destination is the processing-target movement destination set. By iterating such processing, the management blocks are moved to one movement destination set from the corresponding pre-reduction sets. The similar processing is performed for the other movement destination sets.

Since movement of the management blocks to the movement destination set just involves linking of the management blocks to the array of the destination set, no actual data movement occurs for the data blocks corresponding to the management blocks.

The description is continued below by using FIG. 19.

[Step S61] The cache control unit 122 sets the rest of the management blocks (management blocks not processed in FIG. 18) in the pre-reduction sets as unused management blocks. Consequently, each management block is separated from the set serving as the allocation destination.

[Step S62] The cache control unit 122 associates the head and last management blocks of the movement destination sets with the head and last management blocks of the post-reduction sets in the cache 130. For example, the cache control unit 122 sets, as an array H[Sa] of addresses of the head management blocks of the post-reduction sets, an array H'[[0, . . . , size(Sa)−1]] of the corresponding addresses in the movement destination sets. The cache control unit 122 sets, as an array T[Sa] of addresses of the last management blocks of the post-reduction sets, an array T'[[0, . . . , size(Sa)−1]] of the corresponding addresses in the movement destination sets.

[Step S63] The cache control unit 122 releases the addresses of the head and end management blocks of the pre-reduction sets that are no longer in use (for example, the pre-reduction sets other than those serving as the post-reduction sets). Consequently, the state of the pre-reduction sets that are no longer in use is changed to the unused state.

FIG. 16 illustrates the case where the number of sets allocated to the existing process is reduced in response to addition of the new process. In addition to this, as illustrated in FIG. 20 below, the number of sets allocated to each process may be adjusted in accordance with an effect of the cache 130 for the process.

Figure 20:
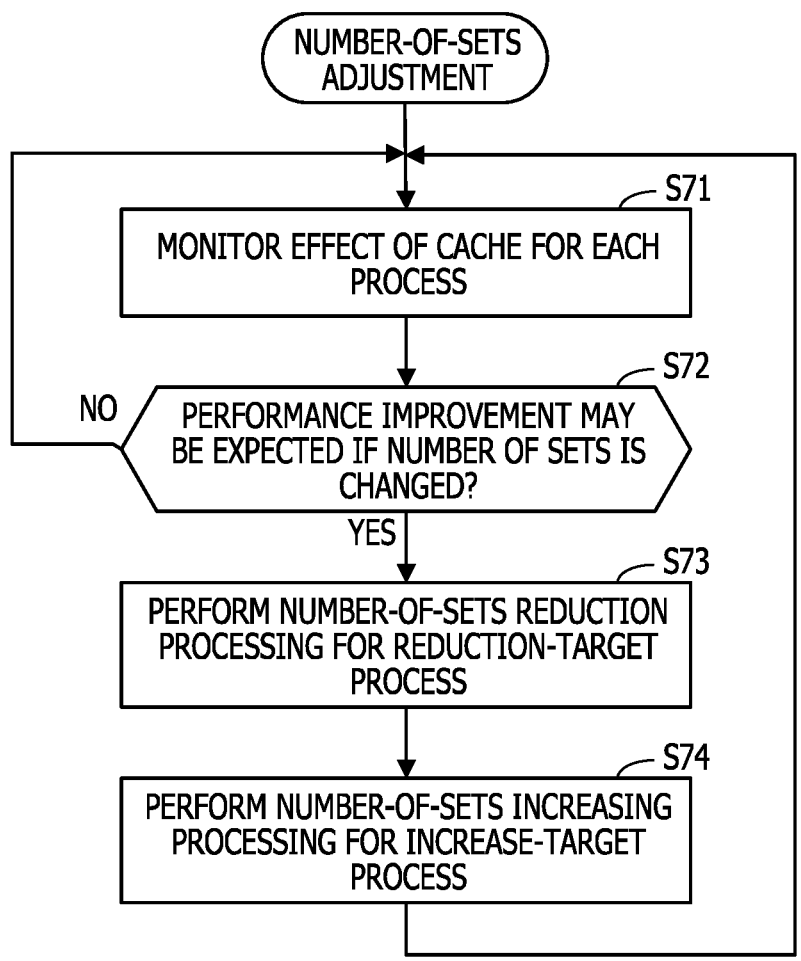
FIG. 20 is an example of a flowchart illustrating number-of-sets adjustment processing.

FIG. 20 is an example of a flowchart illustrating number-of-sets adjustment processing.

[Step S71] The cache control unit 122 monitors an effect (such as average latency in response to an I/O request, for example) of the cache 130 for each process.

[Step S72] Based on the monitoring result, the cache control unit 122 determines whether or not the performance improvement may be expected when the number of allocated sets is changed. When the performance improvement may be expected, the processing proceeds to step S73. When no performance improvement may be expected, the processing proceeds to step S71.

[Step S73] The cache control unit 122 performs processing of reducing the number of allocated sets for a process for which the number of allocated sets is to be reduced.

[Step S74] The cache control unit 122 performs processing of increasing the number of allocated sets for a process for which the number of allocated sets is to be increased.

The processing functions of the apparatuses (for example, the information processing apparatus 10 and the server apparatus 100) according to the individual embodiments described above may be implemented by a computer. In such a case, a program describing processing content of the functions to be included in each apparatus is provided, and the computer executes the program. Consequently, the above-described processing functions are implemented in the computer. The program describing the processing content may be recorded on a computer-readable recording medium. Examples of the computer-readable recording medium include a magnetic storage device, an optical disc, a magneto-optical recording medium, a semiconductor memory, and the like. Examples of the magnetic storage device include a hard disk drive (HDD), a magnetic tape, and the like. Examples of the optical disc include a compact disc (CD), a digital versatile disc (DVD), a Blu-ray disc (BD, registered trademark), and the like.

When the program is distributed, for example, a portable recording medium such as a DVD or a CD on which the program is recorded is sold. The program may also be stored in a storage device of a server computer and be transferred from the server computer to another computer via a network.

The computer that executes the program stores, in a storage device thereof, the program recorded on the portable recording medium or the program transferred from the server computer, for example. The computer reads the program from the storage device thereof and performs processing according to the program. The computer may also read the program directly from the portable recording medium and perform processing according to the program. Each time the program is transferred from the server computer coupled to the computer via the network, the computer may also sequentially perform processing according to the received program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory included a region of a cache; and
a processor configured to perform a first processing when controlling, by using the cache, reading of data blocks from and writing of data blocks to a storage device by a plurality of processes, the first processing includes:
setting a condition related to a first number of first divided regions among a plurality of divided regions obtained by division of the cache and a number of divided regions to be reduced for each of the plurality of processes,
allocating, to a first process among the plurality of processes, the first number of the first divided regions according to the condition, and
determining, based on an address of each data block corresponding to the first process and the first number, a storage destination of the data block corresponding to the first process from among the first divided regions, wherein
the processor is further configured to perform a second processing when reducing the number of first divided regions allocated to the first process, the second processing includes:
changing the first number of first divided regions allocated to the first process to a second number of first divided regions according to the condition, the second number being a divisor of the first number,
identifying, for individual first divided regions after the reduction, based on an interval of addresses of the first divided regions arranged for each certain number in the memory between the first divided regions before the reduction and the first divided regions after the reduction, a plurality of divided regions as second divided regions from among the first divided regions before the reduction,
determining data blocks to be stored in the individual first divided regions after the reduction by allocating data blocks to the first divided regions after the reduction from the corresponding second divided regions in ascending order of purging order, and
releasing a remaining divided region obtained by excluding the first divided regions after the reduction from the first divided regions before the reduction.

2. The information processing apparatus according to claim 1, wherein the second divided regions corresponding to one divided region among the first divided regions after the reduction are identified through selection from among the first divided regions before the reduction at an interval of the second number with respect the one divided region serving as an origin.

3. The information processing according to claim 1, wherein the first number is set as $A \cdot M^N$, where A is a natural number and M and N are natural numbers of 2 or greater, and the second number is $1/M^{N'}$ of the first number, where $N' < N$.

4. The information processing according to claim 3, wherein the processor is further configured to:
allocate, to a second process among the plurality of processes, as many third divided regions as a third number set as $A \cdot M^{N'}$ from among the plurality of divided regions, and reduce the number of third divided regions to $1/M^{N'}$ when reducing the number of third divided regions allocated to the second process, wherein a different value is set for at least one of A, M, N, and N' between the first process and the second process.

5. A non-transitory computer-readable storage medium storing a program that causes a processor included in an information processing apparatus to execute a process, the process comprising:

performing a first processing when controlling, by using a cache, reading of data blocks from and writing of data blocks to a storage device by a plurality of processes, the first processing includes:

setting a condition related to a first number of first divided regions among a plurality of divided regions obtained by division of the cache and a number of divided regions to be reduced for each of the plurality of processes, allocating, to a first process among the plurality of processes, the first number of the first divided regions according to the condition, and determining, based on an address of each data block corresponding to the first process and the first number, a storage destination of the data block corresponding to the first process from among the first divided regions, wherein performing a second processing when reducing the number of first divided regions allocated to the first process, the second processing includes:

changing the first number of first divided regions allocated to the first process to a second number of first divided regions according to the condition, the second number being a divisor of the first number, identifying, for individual first divided regions after the reduction, based on an interval of addresses of the first divided regions arranged for each certain number in a memory between the first divided regions before the reduction and the first divided regions after the reduction, a plurality of divided regions as second divided regions from among the first divided regions before the reduction, determining data blocks to be stored in the individual first divided regions after the reduction by allocating data blocks to the first divided regions after the reduction from the corresponding second divided regions in ascending order of purging order, and releasing a remaining divided region obtained by excluding the first divided regions after the reduction from the first divided regions before the reduction.

6. The non-transitory computer-readable storage medium according to claim 5, wherein the second divided regions corresponding to one divided region among the first divided regions after the reduction are identified through selection from among the first divided regions before the reduction at an interval of the second number with respect the one divided region serving as an origin.

7. The non-transitory computer-readable storage medium according to claim 5, wherein the first number is set as $A \cdot M^N$, where A is a natural number and M and N are natural numbers of 2 or greater, and the second number is $1/M^{N'}$ of the first number, where N'<N.

8. The non-transitory computer-readable storage medium according to claim 7, wherein the process is further comprising:

allocating, to a second process among the plurality of processes, as many third divided regions as a third number set as $A \cdot M^N$ from among the plurality of divided regions, and reducing the number of third divided regions to $1/M^{N'}$ when reducing the number of third divided regions allocated to the second process, wherein a different value is set for at least one of A, M, N, and N' between the first process and the second process.

* * * * *